United States Patent
Ellsworth et al.

(10) Patent No.: US 8,896,696 B2
(45) Date of Patent: Nov. 25, 2014

(54) METHOD APPARATUS SYSTEM AND COMPUTER PROGRAM PRODUCT FOR AUTOMATED COLLECTION AND CORRELATION FOR TACTICAL INFORMATION

(75) Inventors: Christopher C. Ellsworth, Madison, AL (US); Sean Baity, Phoenix, MD (US); Brandon Johnson, Austin, TX (US); Andrew Geer, Austin, TX (US)

(73) Assignee: AAI Corporation, Hunt Valley, MD (US)

( * ) Notice: Subject to any disclaimer, the term of this patent is extended or adjusted under 35 U.S.C. 154(b) by 746 days.

(21) Appl. No.: 12/772,541

(22) Filed: May 3, 2010

(65) Prior Publication Data

US 2010/0277588 A1 Nov. 4, 2010

Related U.S. Application Data

(60) Provisional application No. 61/174,871, filed on May 1, 2009.

(51) Int. Cl.
*H04N 7/18* (2006.01)
*G06F 17/30* (2006.01)

(52) U.S. Cl.
CPC .................................. *G06F 17/3087* (2013.01)
USPC ........... 348/144; 382/103; 382/154; 715/720; 715/765

(58) Field of Classification Search
None
See application file for complete search history.

(56) References Cited

U.S. PATENT DOCUMENTS

| | | | | |
|---|---|---|---|---|
| 4,952,922 A * | 8/1990 | Griffin et al. | ................. | 345/421 |
| 5,651,676 A * | 7/1997 | Artwick | ........................... | 434/43 |
| 6,130,705 A * | 10/2000 | Lareau et al. | ................. | 348/144 |
| 6,392,661 B1 * | 5/2002 | Tankersley | .................... | 345/660 |
| 7,134,088 B2 * | 11/2006 | Larsen | ........................... | 715/765 |
| 7,263,206 B1 * | 8/2007 | Milbert | ......................... | 382/103 |
| 7,406,199 B2 * | 7/2008 | Lindeman | .................... | 382/224 |
| 7,495,198 B2 * | 2/2009 | Ari | .................................. | 244/3.1 |
| 7,619,626 B2 * | 11/2009 | Bernier | ......................... | 345/427 |
| 7,659,906 B2 * | 2/2010 | LinneVonBerg et al. | ..... | 345/536 |
| 7,697,725 B2 * | 4/2010 | Burns et al. | ................... | 382/107 |
| 7,747,364 B2 * | 6/2010 | Roy et al. | ........................ | 701/28 |
| 7,801,328 B2 * | 9/2010 | Au et al. | ........................ | 382/103 |
| 7,865,836 B1 * | 1/2011 | Sperlongano et al. | ......... | 715/771 |
| 7,949,150 B2 * | 5/2011 | Haering et al. | ............... | 382/103 |
| 8,001,115 B2 * | 8/2011 | Davis et al. | ................... | 707/723 |
| 8,023,694 B2 * | 9/2011 | Rhoads et al. | ................ | 382/100 |
| 8,036,678 B2 * | 10/2011 | Goldenberg et al. | ....... | 455/456.1 |
| 8,108,435 B2 * | 1/2012 | Mershon et al. | ............... | 707/794 |
| 8,115,768 B2 * | 2/2012 | Sroka et al. | ................... | 345/427 |
| 8,116,526 B2 * | 2/2012 | Sroka et al. | ................... | 382/103 |
| 8,250,481 B2 * | 8/2012 | Klaric et al. | .................. | 715/765 |

(Continued)

OTHER PUBLICATIONS

International Search Report and Written Opinion mailed Jul. 9, 2010 in related PCT/US2010/033407.

(Continued)

*Primary Examiner* — Greg C Bengzon

(74) *Attorney, Agent, or Firm* — Venable LLP; Jeffri A. Kaminski

(57) ABSTRACT

A method, and corresponding system, apparatus, and computer program product for automated collection and correlation for tactical information includes identifying an entity in imagery based on a field of view of the imagery using a processor, creating a relationship between the imagery and the entity, and storing the relationship in a database.

21 Claims, 26 Drawing Sheets

(56) References Cited

U.S. PATENT DOCUMENTS

| | | | | |
|---|---|---|---|---|
| 8,289,390 | B2* | 10/2012 | Aggarwal et al. | 348/143 |
| 8,315,477 | B2* | 11/2012 | Acree | 382/284 |
| 8,527,115 | B2* | 9/2013 | Greenfeld et al. | 701/3 |
| 2005/0278087 | A1* | 12/2005 | Lahn | 701/23 |
| 2007/0093945 | A1* | 4/2007 | Grzywna et al. | 701/23 |
| 2007/0182713 | A1* | 8/2007 | Kereth | 345/161 |
| 2007/0277111 | A1* | 11/2007 | Bennett et al. | 715/763 |
| 2007/0300170 | A1* | 12/2007 | Bier et al. | 715/764 |
| 2008/0043020 | A1* | 2/2008 | Snow et al. | 345/427 |
| 2008/0062167 | A1* | 3/2008 | Boggs et al. | 345/419 |
| 2008/0158256 | A1* | 7/2008 | Russell et al. | 345/629 |
| 2008/0166014 | A1* | 7/2008 | Marcus et al. | 382/103 |
| 2008/0186255 | A1* | 8/2008 | Cohen et al. | 345/8 |
| 2008/0231473 | A1* | 9/2008 | Wyatt et al. | 340/971 |
| 2009/0080696 | A1 | 3/2009 | Cochran et al. | |
| 2009/0157233 | A1* | 6/2009 | Kokkeby et al. | 701/3 |
| 2009/0289937 | A1* | 11/2009 | Flake et al. | 345/419 |
| 2010/0199189 | A1* | 8/2010 | Ben-Aroya et al. | 715/736 |
| 2010/0228418 | A1* | 9/2010 | Whitlow et al. | 701/25 |
| 2013/0145270 | A1* | 6/2013 | Piran et al. | 715/720 |
| 2013/0169675 | A1* | 7/2013 | Shulman et al. | 345/629 |

OTHER PUBLICATIONS

Berridge, Walter T. et al., "Scene-Centric Identification and Retrieval of Unmanned Aerial Vehicle (UAV) Video Segments." Proceedings of the National Aerospace & Electronics Conference, Oct. 12, 2000, [retrieved on Jun. 15, 2010]. Retrieved from the Internet: <URL:http://ieee.org/application/enterprise/entconfirmation.jsp?amumber=894995> pp. 794-800.

Kumar, Rakesh et al., "Aerial Video Surveillance and Exploitation," Proceedings of the IEEE, vol. 89, No. 10 Oct. 2001 [retrieved on Jun. 15, 2010]. Retrieved from the internet: <URL:http://citeseerx.ist.psu.edu/viewdoc/summary?dol=10.1.1.115.2557> pp. 1518-1537.

* cited by examiner

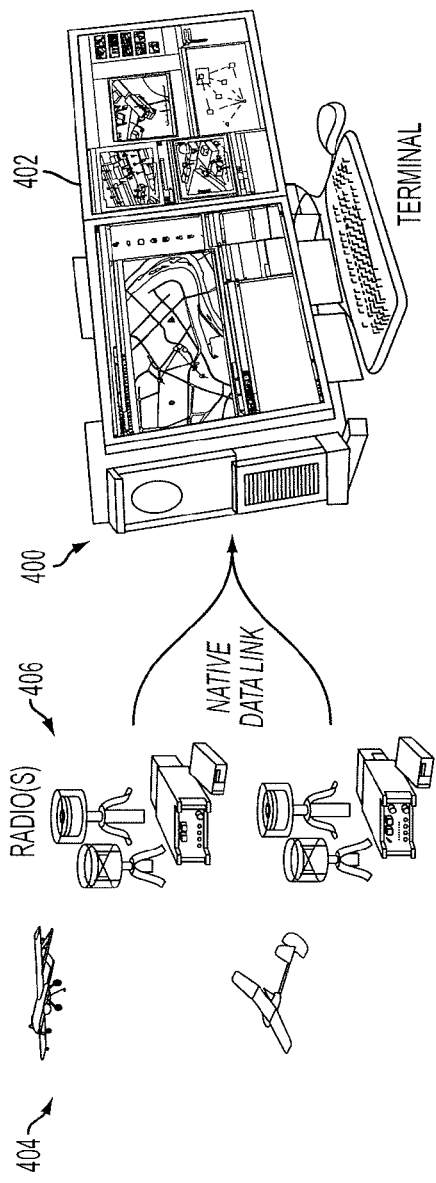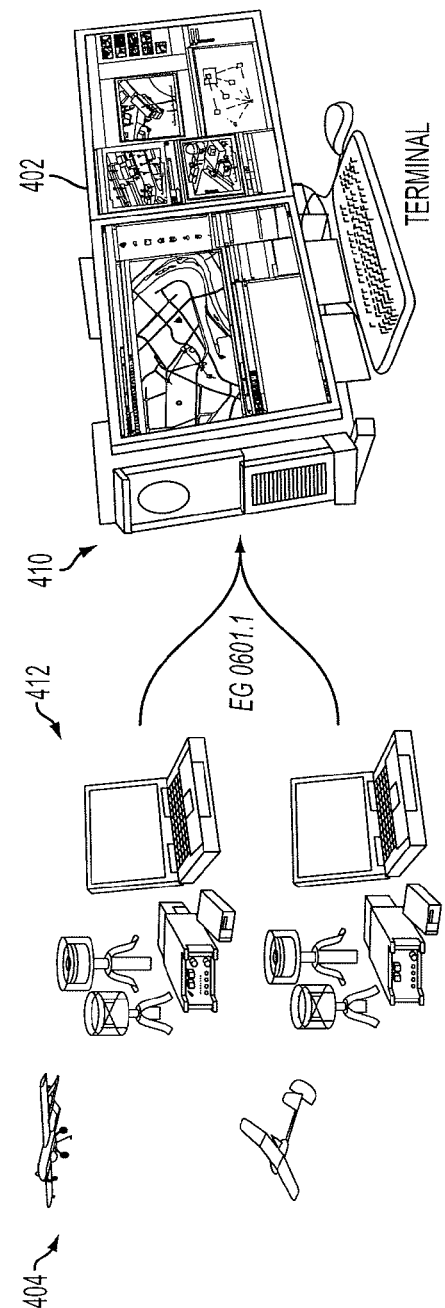

METHOD APPARATUS SYSTEM AND COMPUTER PROGRAM PRODUCT FOR AUTOMATED COLLECTION AND CORRELATION FOR TACTICAL INFORMATION

CROSS REFERENCE TO RELATED APPLICATIONS

This application claims priority to U.S. Provisional Application 61/174,871, filed on May 1, 2009, and incorporated in its entirety by reference hereto.

BACKGROUND

1. Field

Exemplary embodiments relate generally to data collection, and more particularly to automated collection and correlation for tactical information.

2. Related Art

A number of Unmanned Vehicles (UV), vehicles operated without drivers or pilots, have come to be used in modern times. UV include Unmanned Ground Vehicles (UGVs), land-based vehicles driven without a driver, and Unmanned Air Vehicles (UAV), aircrafts flown without a pilot. A number of different UAVs have grown in modern times. Exemplary types of UAVs offered by the UAV industry include organic air vehicles (OAVs), micro air vehicles (MAVs), and unmanned combat air vehicles (UCAVs).

Conventionally, information from an UAV is broadcasted to a remote sensor ground station. The remote sensor ground station gathers and records many hours of video, which is saved to a tape or DVD. Data is extracted from live collection points and manually moved to an analysis system. Analysts then seek through hours of imagery to find relevant intelligence. Analyzation using this method may be time consuming and resource intensive. Additionally, the growing use of unmanned aerial vehicles (UAV) surveillance has resulted in an increase in the amount of tactical information from UAVs that must be analyzed.

SUMMARY

In an illustrative embodiment of the present invention, a method, computer readable medium, and a device is disclosed. According to one embodiment, a method for automated collection and correlation for tactical information may be provided. The method may include identifying an entity in imagery based on a field of view of the imagery using a processor, creating a relationship between the imagery and the entity, and storing the relationship in a database.

According to another embodiment, a computer readable medium storing computer, readable program code is provided. The code may cause a computer to perform a method for automated collection and correlation for tactical information, the method including receiving criteria for capturing imagery, monitoring a field of view of a remote sensor using a processor, identifying an intersection of the field of view and the criteria using the processor, and instructing imagery of the remote sensor to be captured based on the identification.

According to another embodiment, a device for automated collection and correlation for tactical information may be provided. The device may include means for receiving imagery and telemetry data from a remote sensor, means for receiving entity information, and means for correlating the imagery with the entity information based on the telemetry data.

Further features and advantages of the invention, as well as the structure and operation of various exemplary embodiments of the invention, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings:

FIGS. 4A, 4B depict exemplary depictions of the physical components of the system in accordance with exemplary embodiments;

DETAILED DESCRIPTION OF EMBODIMENTS OF THE EMBODIMENTS

Various exemplary embodiments are discussed in detail below including a preferred embodiment. While specific implementations are discussed, it should be understood that this is done for illustration purposes only. A person skilled in the relevant art can recognize that the systems, methods and features provided herein may be used without departing from the spirit and scope of the invention. Furthermore, any and all references cited herein shall be incorporated herein by reference in their respective entireties.

Exemplary Embodiments

Figure 1:
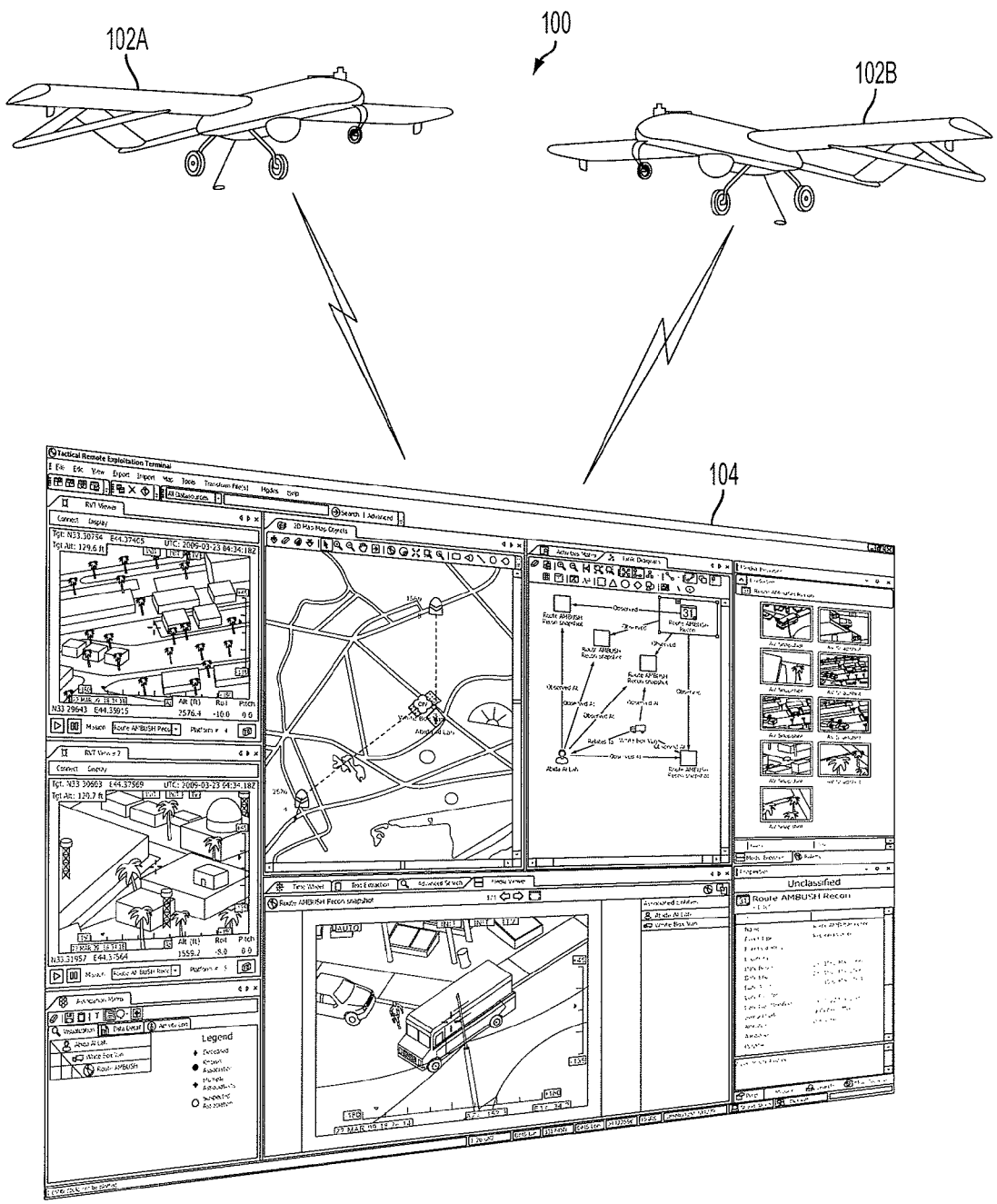
FIG. 1 depicts an exemplary diagram of a system of unmanned aerial vehicles and a terminal in accordance with exemplary embodiments.

FIG. 1 depicts an exemplary diagram 100 of a system of unmanned aerial vehicles (UAV) 102A and 102B (hereinafter collectively referred to as 102) and a terminal 104 in accordance with exemplary embodiments. According to an exemplary embodiment of the system, UAVs 102 may be used to gather information to be displayed on the interface of a terminal 104, for example, using one or more cameras or video recorders located on the UAV 102. The terminal 104 may provide a single user interface for the simultaneous collection and analysis of intelligence from multiple remote sensing systems, such as, e.g., but not limited to, UAVs 102. For example, information may alternatively or additionally be gathered by one or more UGVs. According to an exemplary embodiment, the terminal 104 may provide real-time correlation of intelligence data with imagery, such as, e.g., but not limited to, video snapshots or real-time video.

According to an exemplary embodiment, the method may integrate live remote sensor intelligence with analysis workflows executed by the terminal. Workflows may be a sequence of steps with decision boundaries defining different steps for different conditions. One workflow may allow a user to automatically capture geo-referenced intelligence from a remote sensor into a relational database. Another workflow may create relationships between the intelligence imagery (such as, e.g., but not limited to, video clips and/or snapshots, etc.) and entities in the database (such as, e.g., but not limited to, person, vehicle, event, and/or facility, etc.).

In an exemplary embodiment, the platforms may be various manned or unmanned air vehicles, ground stations or any remote sensing device. According to an exemplary embodiment, two methods for collecting intelligence may be: (1) manual collection, and (2) automated collection.

In an exemplary embodiment, in the manual collection method, a user may monitor information from a remote sensor and manually indicate when the information from the remote sensor should be captured to the database.

According to an exemplary embodiment, in the automated collection method, a user may define criteria for information to be captured, such as, e.g., but not limited to, areas of interest or entities of interest. In an exemplary embodiment, information from the remote platform may be automatically captured when the criteria is met, such as, e.g., but not limited to, when an area of interest or entity of interest falls within the field of view of a sensor.

In an exemplary embodiment, when imagery is captured it may also be immediately geo-referenced (i.e., saved with all its geo-spatial information), automatically associated with entities which exist in the sensor's field of view, and stored in the database. Correlation information relating the imagery and entities may be associated with the imagery and also saved in the database.

Figure 2:
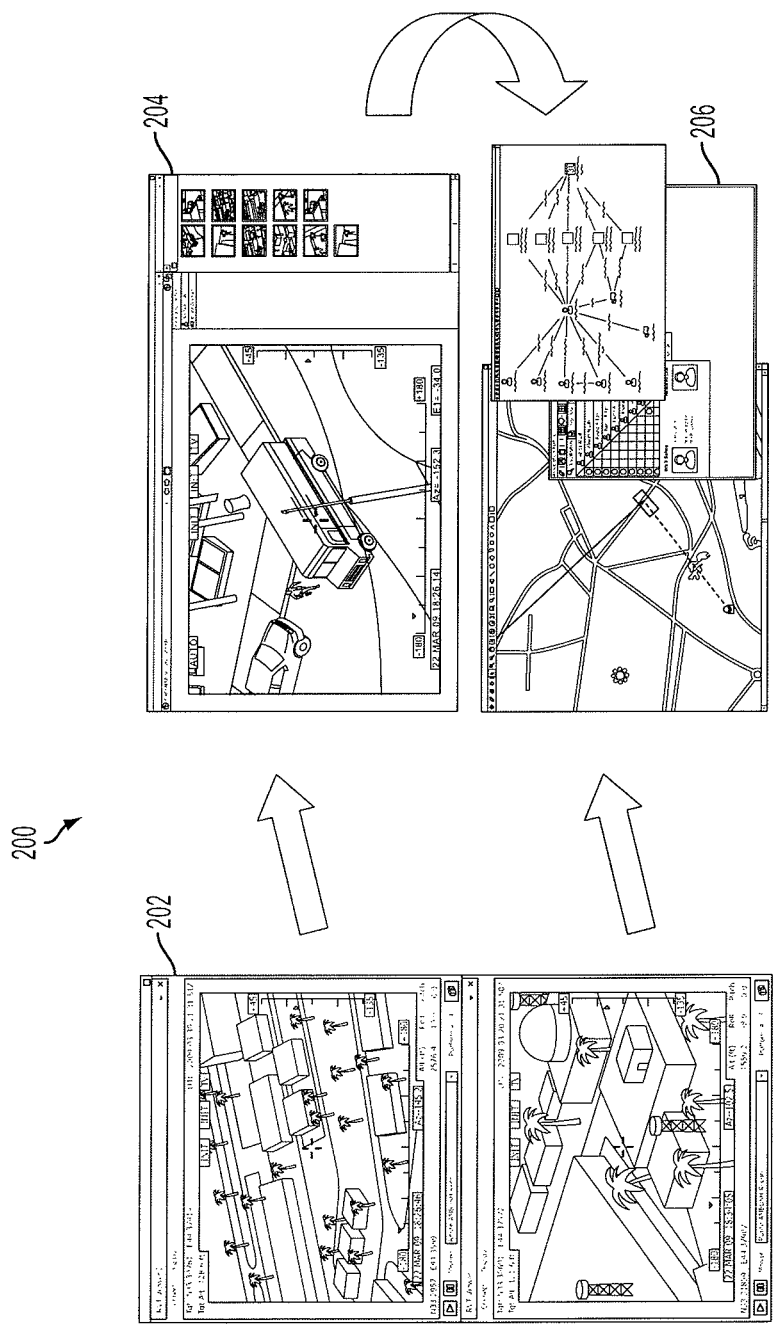
FIG. 2 depicts an exemplary logical diagram of the type and flow of information in the system in accordance with exemplary embodiments.

FIG. 2 depicts an exemplary logical diagram 200 of the type and flow of information in the system in accordance with exemplary embodiments. According to an exemplary embodiment, data from one or more UAVs 102 of one or more types may be gathered by the terminal 104. In an exemplary embodiment, each UAV 102 may be considered a platform. The UAVs 102 may provide live intelligence 202 that may feed into powerful analysis tools 204 of the terminal 104, which may be backed by a searchable relational database 206.

Figure 3:
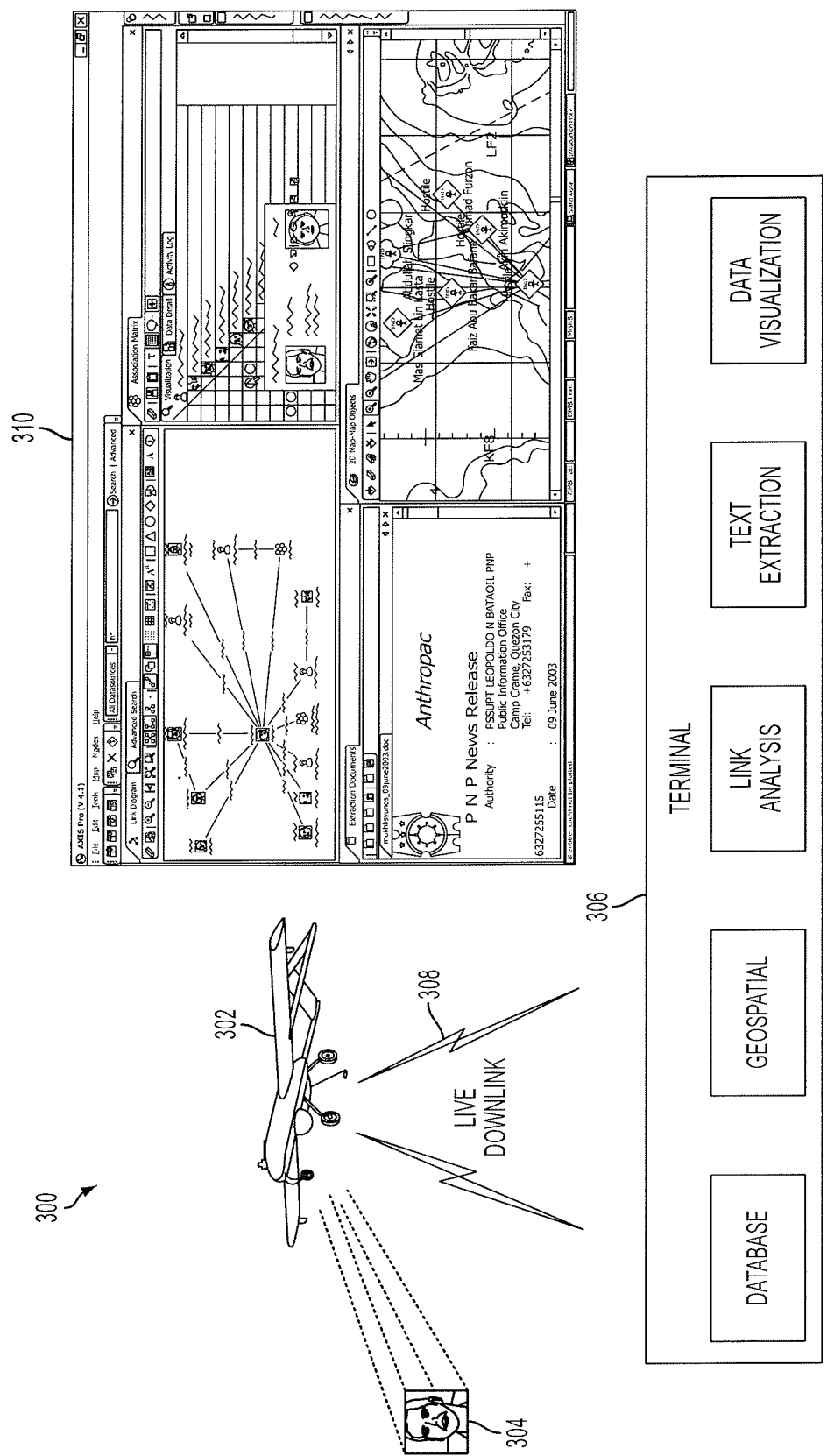
FIG. 3 depicts an exemplary diagram of the components and capabilities of the system in accordance with exemplary embodiments.

FIG. 3 depicts an exemplary diagram of the components and capabilities of the system in accordance with exemplary embodiments. According to an exemplary embodiment, the remote sensing platform 302, e.g., such as, but not limited to, an UAV, may be used to observe an individual 304. The remote sensing platform 302 may provide the information to the terminal 306 using a live downlink 308. The terminal 306 may use the information for database storage, geo-spatialization, link analysis, text extraction and data visualization. In an exemplary embodiment, the terminal 306 may provide an interface 310 displaying information collected from the UAV. The interface may display graphical data such as, e.g., but not limited to, maps, relational charts, textual analysis, bar charts, time wheels, grids, and documents, etc.

FIGS. 4A-4B depict exemplary depictions 400 and 410 of the physical components of the system in accordance with exemplary embodiments. Referring to FIG. 4A, according to an exemplary embodiment, the terminal 402 may directly communicate and control the UAV 404 via a receiving ground radio 406. The UAV 404 may transmit information it receives from sensory input to a receiving ground radio 406. In an exemplary embodiment, the receiving ground radio 406 may then provide the data to the terminal 402. The data from the UAV 404 may be encoded and the terminal 402 may decode the data from the UAV 404. In an exemplary embodiment, the terminal 402 may directly control the radio of the UAV 404. The terminal 402 may use a vehicle generic interface based on a remote video terminal system interface, allowing expansion to support other types of manned & unmanned platforms.

Referring to FIG. 4B, according to another exemplary embodiment, the terminal 402 may use remote video terminal system 412 technology to communicate with the UAV 404. In an exemplary embodiment, UAV 404 may transmit information it receives from sensory input to a complete remote video terminal system 412. The remote video terminal system 412 may decode the data link from the UAV 404 and provide the information to the terminal 402. In an exemplary embodiment, a separate remote video terminal system 412 system may be used for each live remote platform to perform all radio control and data link decoding. According to an exemplary embodiment, the information provided from the remote video terminal system 412 to the terminal 402 may be in the form of the Motion Imagery Standards Board's (MISB) Engineer Guidance (EG) 0601.1. The terminal 402 may read MPEG2 transport streams (TS) with MPEG2 or H264 video elementary stream, or MISB EG 0601.1 Key Linked Value (KLV) telemetry elementary stream. According to an exemplary embodiment, the MPEG2 TS can come from a User Datagram Protocol (UDP) network stream or a file source.

Figure 5:
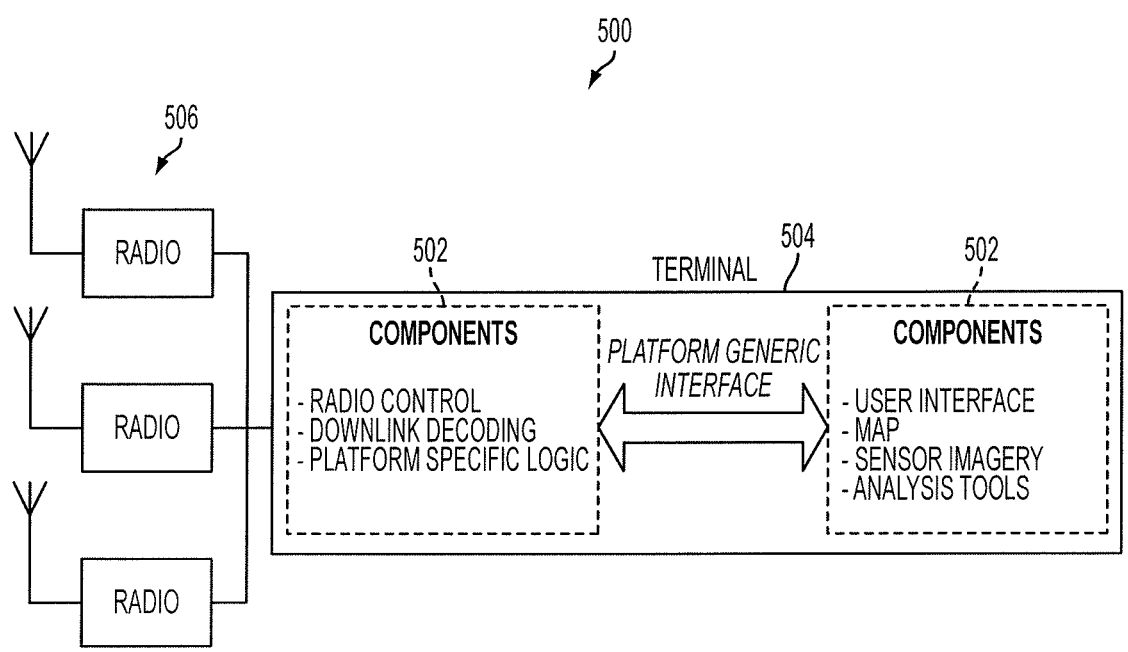
FIG. 5 depicts an exemplary block diagram of the components of a terminal of the system in accordance with exemplary embodiments.

FIG. 5 depicts an exemplary block diagram 500 of the components 502 of a terminal 504 of the system in accordance with exemplary embodiments. According to an exemplary embodiment, multiple radios 506 of multiple UAVs may be linked to and communicate with a terminal 504. In an exemplary embodiment, the terminal 504 may communicate with the radios 506 using components 502 for radio control, downlink decoding and/or platform specific knowledge. The radio control component may be used to control the radios. The downlink decoding component may be used to decode information received from the radios. The platform specific logic component may be used for compatibility with specific types of remote platforms.

According to an exemplary embodiment, the terminal 504 may also include components 502 to interface with the data gathered from the radios 506. A user interface component may provide an interface for users to view and modify the data gathered. A map component may provide map functionality for the terminal 504 to display and receive map based information. A sensor imagery component may display or analyze sensor images. The terminal may have analysis tool components for analyzing the data gathered from the radios.

Figure 6:
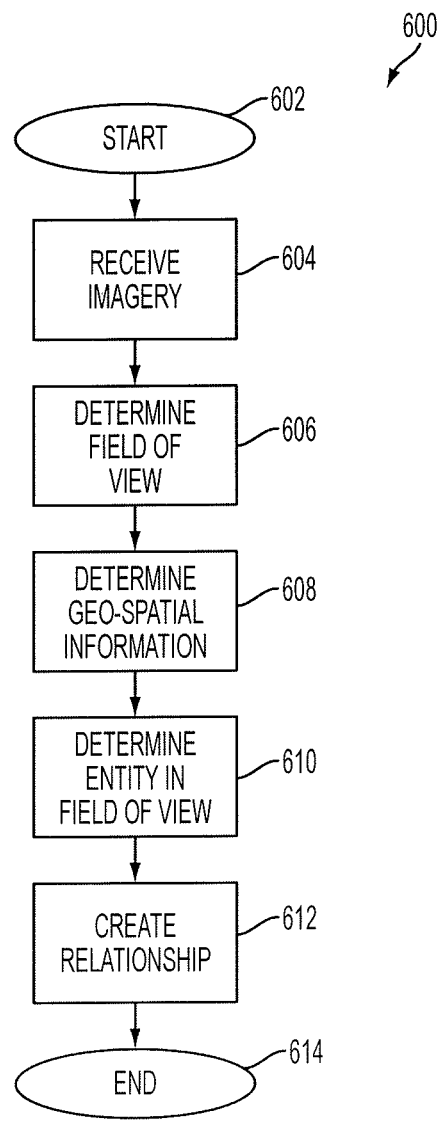
FIG. 6 depicts an exemplary flowchart for creating relationships in accordance with exemplary embodiments.

FIG. 6 depicts an exemplary flowchart 600 for creating relationships in accordance with exemplary embodiments. According to an exemplary embodiment, the system may integrate live remote sensor intelligence with analysis workflows. The system may allow a user to automatically capture geo-referenced intelligence from a remote sensor into a relational database. According to an exemplary embodiment, once intelligence is captured to the database, the user may be able to create relationships between the intelligence imagery (such as, e.g., but not limited to, video clips, snapshots) and entities in the database (such as, e.g., but not limited to, person, vehicle, facility, etc.).

According to an exemplary embodiment, flowchart 600 may begin with 602 and continue with 604. In 604, the system may receive imagery 604. According to an exemplary embodiment, the terminal may gather intelligence simultaneously from multiple platforms (such as, e.g., but not limited to, various manned or unmanned air vehicles, ground stations or any remote sensing device). Imagery may be taken by the platforms and provided to the terminal.

From 604, flowchart 600 may continue with 606. In 606, the system may determine the field of view of the imagery. According to an exemplary embodiment, the imagery may be immediately geo-referenced (such as, e.g., but not limited to, saved with all its geo-spatial information) when taken. In an exemplary embodiment, the geo-spatial information may include information that defines the field of view in the imagery, such as, e.g., but not limited to, the longitude and latitude positions of four corners defining a location in the image. The four corners may be the four corners of a rectangular image.

According to an exemplary embodiment, the four corners of the location in the image may be determined based off the telemetry data, angle, altitude, orientation and/or position of the remote platform. In an example, the position of the remote platform may be based on Global Positioning System (GPS) information. In an exemplary embodiment, the four corners of the location may be calculated based on calculating the view of a sensor of the UAV using the position of the sensor, the direction the sensor is facing and the angle between the sensor and the ground. A location may be defined by three or more points.

According to an exemplary embodiment, the geo-spatial information of an image may be provided by the remote platform which collected the imagery. The remote platforms may be equipped with GPS and the remote platforms may provide their geo-spatial information when the imagery is taken. According to an exemplary embodiment, the remote platform may instead calculate the geo-spatial information of the image by some other means, such as, e.g., but not limited to, image recognition. The remote platform may simply provide information to the terminal and the terminal may determine the field of view of the image.

From 606, flowchart 600 may continue with 608. In 608, the system may determine the geo-spatial information of one or more entities. According to an exemplary embodiment, the system may access the geo-spatial information of an entity stored in a database. In another embodiment, the system may calculate the geo-spatial information of an entity. For example, the system may calculate the geo-spatial information of an entity in real-time based on information received from another monitored information source. In another embodiment, the system may directly receive geo-spatial information of the entity from an external source.

From 608, flowchart 600 may continue with 610. In 610, the system may determine an entity is within the field of view. The system may determine the entity is within the field of view based on comparing the determined geo-spatial information of the entity and the field of view of the imagery.

In an exemplary embodiment, the terminal may know the geo-spatial information for entities and may determine an entity is related to an image by comparing the geo-spatial information of the image to the geo-spatial information of the entity. An entity may be related to an image if the geo-spatial information of the entity indicates the entity was located in the imagery based off the location defined by the geo-spatial information of the imagery. The system may take any geo-spatialized imagery and compare the geo-spatial information of the field of view of the imagery with the geo-spatial information of all entities at the time the imagery was taken. For all entities for which the geo-spatial information of the entity indicates the entity may be found within the field of view of the imagery, the entity may be determined to be in the field of view.

From 610, flowchart 600 may continue with 612. In 612, the system may create a relationship. According to an exemplary embodiment, the terminal may automatically create relationships between entities and the imagery based on the determination an entity is within the field of view of the image. In an exemplary embodiment, the terminal may automatically create relationships for an image by searching a database of entities for entities that are located within the location of an image. The terminal may create relationships between entities appearing in the same imagery based on the determination made in 612. Relationships may be between imagery and entities or between entities. According to an exemplary embodiment, the relationships may be stored in the database.

From 612, flowchart 600 may end with 614. In an exemplary embodiment, the terminal may process both real-time and non real-time data. In the case of non real-time data, imagery processed may be pre-recorded imagery and geo-spatial information of the entities may be historical data.

Figure 7:
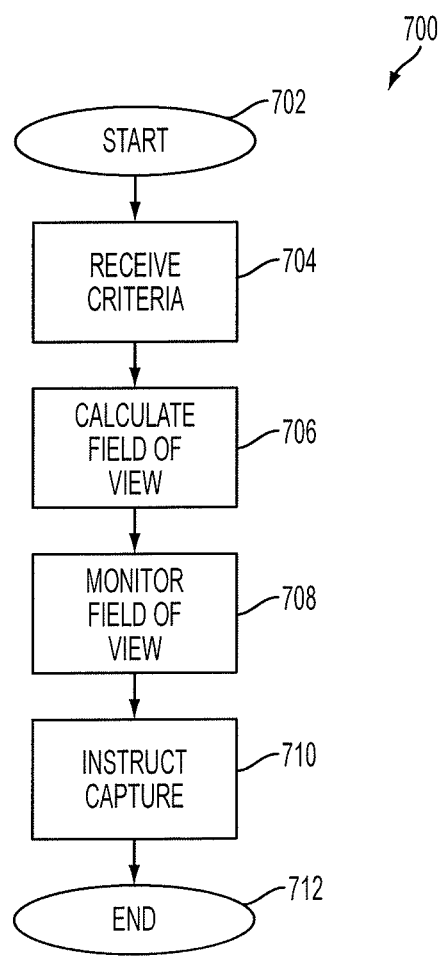
FIG. 7 depicts an exemplary flowchart for capturing imagery in, accordance with exemplary embodiments.

FIG. 7 depicts an exemplary flowchart 700 for capturing imagery in accordance with exemplary embodiments. In an exemplary embodiment, intelligence may be collected manually or automatically. In the manual collection method, the user may monitor a mission using live or recorded remote sensor intelligence, looking for important moments. In an exemplary embodiment, as these moments occur, the user may capture intelligence imagery by means of atomic interactions, such as a single mouse click.

According to an exemplary embodiment, intelligence imagery may be captured automatically, as shown in flowchart 700. Flowchart 700 begins with 702 and continues with 704. In 704, the system receives collection criteria. The collection criteria may be received from a user. In an exemplary embodiment, a user may define collection criteria for the automated capture of intelligence imagery. According to an exemplary embodiment, users may define three types of collection criteria. Each type of collection criteria may correspond to its own workflow. A first definition may allow the user to mark areas of interest (AOI) by drawing polygonal regions (or any other type of region) on a map. A second definition may allow the user to select existing or new entities of interest (EOI) for observation, such as, e.g., but not limited to, a facility, an artillery unit, a person, a vehicle, or an event, etc.

According to the exemplary definitions, the difference between an AOI and an EOI may be the AOI is a static area for observation while the EOI can be moved around as the database is updated from intelligence reports (e.g., an artillery unit that moves once every week to a new known location).

A third definition may allow the user to define collection criteria based on another monitored information source, such as, e.g., but no limited to, signals. The monitoring of signals may provide for signal activation based imagery correlation or imagery capture. For example, signals monitored may be signals associated with wireless communications. In an exemplary embodiment, the terminal may receive and monitor wireless communications from wireless phones. According to an exemplary embodiment, EOI for observation may be based on collection criteria on another monitored information source. A user may define collection criteria so that upon detecting a particular signal in the wireless communication, the terminal may define an event type entity associated with the particular signal at the location in which the wireless phone is located, capture imagery in which the entity is located, and correlate the captured imagery with the entity. The location of the wireless phone at a particular time may be known based on triangulation of the origin of the signal or other technical means.

From 704, flowchart 700 may continue with 706. In 706, the system may calculate the field of view of the sensor. As remote sensor intelligence comes into the system, the sensor's telemetry may be used to determine if the sensor's field of view intersects with an AOI or EOI. If it does, the system may capture imagery at pre-selected intervals, such as, e.g., but not limited to, one minute intervals. Additional functions may be performed, including for example, (1) perform geo-referencing, (2) relate the imagery to the AOI/EOI and mission, and (3) store the imagery and relations in the database. According to an exemplary embodiment, once the AOIs and EOIs have been established, the collection of intelligence may be entirely automated.

In an exemplary embodiment, the terminal may determine a sensor's field of view intersects with an AOI by comparing the geo-spatial information of imagery with the geo-spatial information of the AOI. If any of the locations within the field of view of the sensor also fall within a location within an AOI, the field of views may be considered intersecting and the sensor may capture the imagery for the terminal.

In an exemplary embodiment, the terminal may determine a sensor's field of view intersects with an EOI in a similar manner. According to an exemplary embodiment, the terminal may compare the geo-spatial information of imagery with the geo-spatial information of the EOI. The terminal may know the current geo-spatial information for EOIs, such as, e.g., but not limited to, the longitude and latitude of entities at a given time.

From 706, flowchart 700 may continue with 708. In 708, the system may monitor the field of view of the sensor. According to an exemplary embodiment, the terminal may continuously determine the current field of view of a sensor and search a database of EOIs for any EOI that is located within the current field of view of the sensor at the time the imagery was sensed by the sensor.

From 708, flowchart 700 may continue with 710. In 710, the system may instruct the imagery to be captured. In an exemplary embodiment, if an entity is determined to be within the current field of view of a sensor, the field of view may be considered to be intersecting and imagery from the sensor may be captured. According to an exemplary embodiment, other criteria may be used to determine if the field of view of a sensor and an EOI intersect. In an exemplary embodiment, image recognition for entities may be used for the current field of view of a sensor, and if an entity is recognized, the field of view may be considered intersecting and the imagery captured.

From 710, flowchart 700 may continue with 712 and end. In an exemplary embodiment, for manual and automatic collection methods, captured intelligence may be automatically associated with entities which are within the sensor's field of view when imagery is captured.

According to an exemplary embodiment, once intelligence has been collected, it may be explored through the relationships automatically created during capture. In an exemplary embodiment, once these relationships have been constructed, a user may able to navigate complex relationship graphs to discover knowledge about the structure of social networks. According to an exemplary embodiment, these relationships may also be used to build collections of imagery based on search query criteria, where the criteria is used to determine which relationships are followed when building the imagery list. In an exemplary embodiment, these tools may allow the analyst to quickly gather large amounts of relevant intelligence and to mine it for knowledge using relationship-based analysis tools, removing the need to record hours of irrelevant remote sensor intelligence analysts must seek through to look for important moments.

According to an exemplary embodiment, the data may be real-time data currently being acquired from a remote sensor platform. In an exemplary embodiment, the intelligence imagery may be non-real time and the terminal may determine relationships and if the data should be captured based on historical positioning data.

According to an exemplary embodiment, the terminal may include an extensible modular intelligence automation engine. In an exemplary embodiment, the intelligence automation engine may perform workflow orchestrations that tie together components of the terminal and automate tasks to be executed by the terminal. According to an exemplary embodiment, the engine may include a main control and a workflow management process which manages a collection of independent workflow components running in separate threads. The workflow components may be modular "plug-ins" and may implement a common interface and life cycle. The workflow components may be compiled as separate independent components allowing workflows to be easily added or removed. Workflows may also be created by a user using a graphical flow chart-based workflow creation tool. The user may draw flow-charts depicting complex intelligence automation tasks and have the tasks executed by the intelligence automation engine.

In an exemplary embodiment, each workflow component may correspond with a workflow. A first workflow component may be to determine if imagery contains an AOI, a second workflow component may be to determine if imagery contains a pre-defined EOI, and a third workflow component may be to monitor an information source to determine if imagery contains an object of interest based on the monitored information. According to an exemplary embodiment, the modules may be enabled or disabled as needed. When processing imagery, the imagery may be processed using each module enabled.

Figure 8:
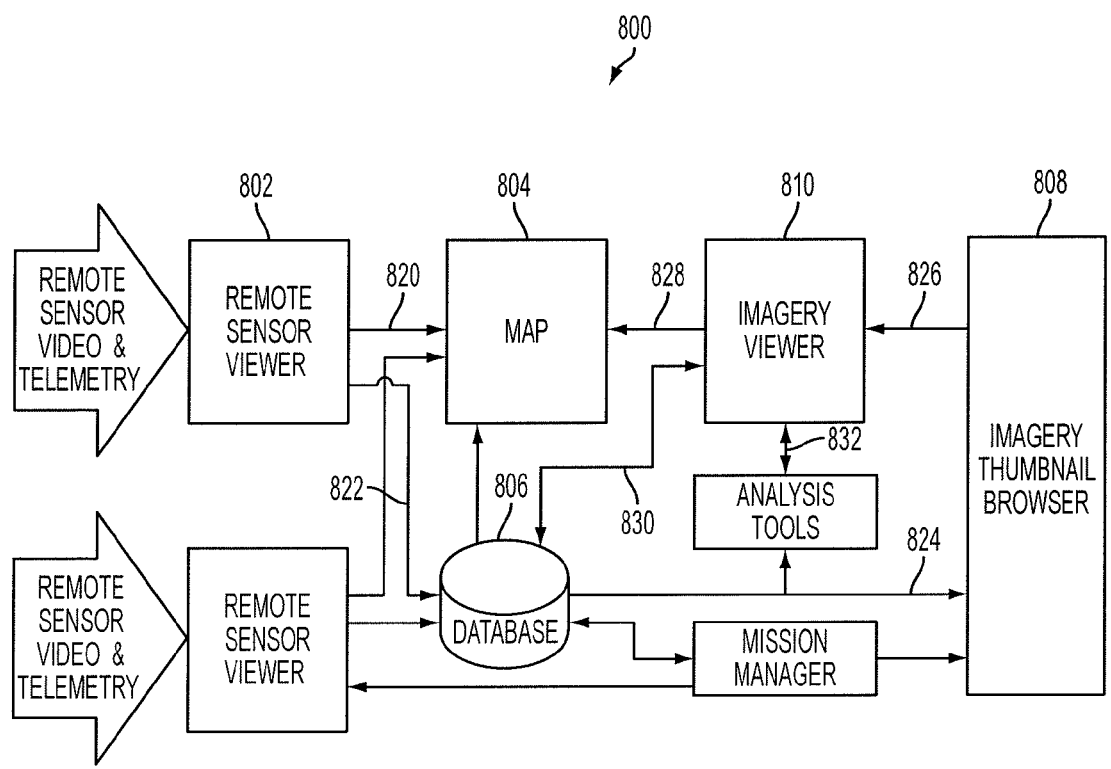
FIG. 8 depicts an exemplary detailed block diagram of the components of a terminal of the system in accordance with exemplary embodiments.

Referring to FIG. 8, according to an exemplary embodiment, the terminal may include a number of components to capture intelligence imagery information. In an exemplary embodiment, the terminal may include a remote sensor viewer 802 which may connect to live or recorded remote sensor intelligence. In an exemplary embodiment, the remote sensor viewer 802 may provide a "media player" style interface, decode platform telemetry, and capture intelligence imagery to the database. According to an exemplary embodiment, the remote sensor viewer 802 may create relationships from the sensor intelligence and may determine when a platform should capture data when using automated collection.

In an exemplary embodiment, the terminal may include a map component 804 for displaying maps with overlaid MIL STD 2525B symbology for remote sensor platforms and entities from the database.

According to an exemplary embodiment, the terminal may include a database component 806 for a searchable relational database that stores entities and captured sensor imagery.

In an exemplary embodiment, the terminal may include an imagery thumbnail browser 808 for displaying thumbnails for imagery associated with selected AOI, EOI, or any other entity.

According to an exemplary embodiment, the terminal may include an imagery viewer component 810 providing an interface for imagery examination, annotation, and the association creation.

An exemplary embodiment of data flow is also depicted in FIG. 8. According to an exemplary embodiment, via dataflow 820, the remote sensor viewer 802 decodes platform telemetry and sends commands to the map component 804 to display the remote sensor platforms. According to an exemplary embodiment, the telemetry data may include information, such as, e.g., but not limited to location, heading, and altitude. In an exemplary embodiment, other information decoded by the remote sensor viewer 802 may include sensor stare point and footprint field of view.

According to an exemplary embodiment, via dataflow 822, the remote sensor viewer 802 may capture sensor imagery, perform geo-referencing, and store the sensor imagery and geo-referencing information in the database 806.

In an exemplary embodiment, via dataflow 824, the imagery thumbnail browser 808 may display thumbnails which are associated with a currently selected entity (e.g., AOI, EOI or mission). According to an exemplary embodiment, via dataflow 826, when a thumbnail is selected in the imagery browser 808, the selection may cause a command to be sent to the imagery viewer to display the selected imagery.

In an exemplary embodiment, via dataflow 828, the imagery viewer may send commands to the map component 804 to display the sensor stare point and footprint field of view of the currently selected image on the map. According to an exemplary embodiment via dataflow 830, the imagery viewer may provide a drag and drop interface for displaying and creating relationships between imagery and entities in the database 806. In an exemplary embodiment, the imagery viewer may provide an interface to other analysis tools (e.g., entity search, activities matrix, link analysis tool for viewing or creating relationships) via dataflow 832.

According to an exemplary embodiment, via dataflow 834, the map may display entities from the database.

Figure 9:
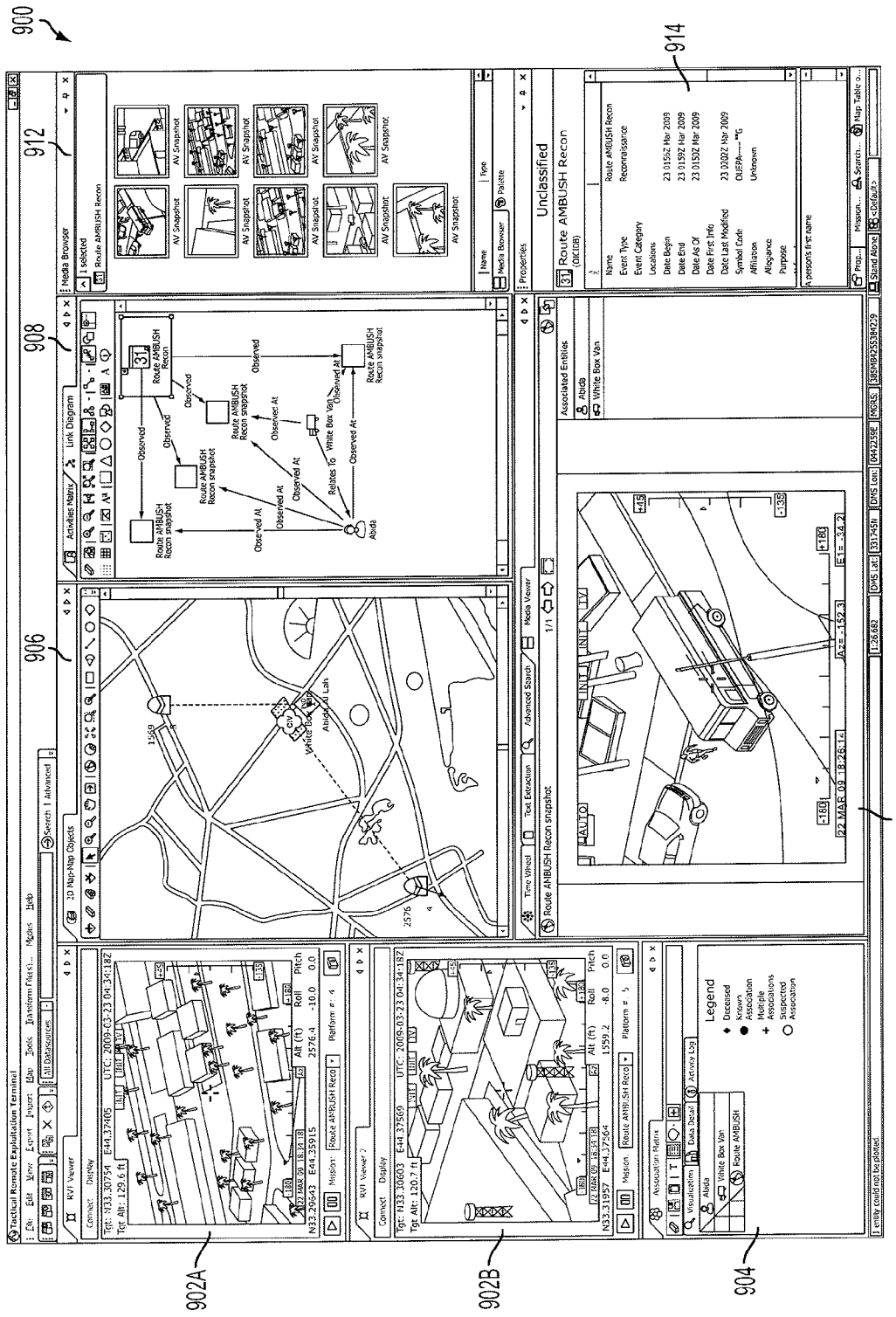
FIG. 9 depicts an exemplary interface of a terminal of the system in accordance with exemplary embodiments.

FIG. 9 depicts an exemplary interface of a terminal of the system in accordance with exemplary embodiments. According to an exemplary embodiment, the terminal may provide an interface for a user to interact with the system.

According to an exemplary embodiment, the interface may allow a user to use an AOI for automated collection of intelligence imagery. In an exemplary embodiment, the user may select a pre-existing AOI or may create a new AOI. According to an exemplary embodiment, to create a new AOI, the user may define an AOI by, such as, e.g., but not limited to, drawing a polygon on the map, designating coordinates defining an area, etc.

According to an exemplary embodiment, the interface may also provide support for viewing multiple live or recorded video streams, creation of snapshots from video, which may be saved to the database with their geo-spatial information, drag-and-drop creation of relationships between database entities and snapshots, and snapshot viewing & browsing by relationship. The interface may provide graphical video overlays for platform status info such as, e.g., but not limited to, telemetry information, heading, sensor depression, battery level, damage, etc. The interface may also display other metadata associated with intelligence imagery.

In an exemplary embodiment, the interface may display one or more imagery streams 902A and 902B from one or more UAVs. The interface may display an association matrix 904 of various entities and relationships stored within the database. The interface may provide a map 906 for a user to view data geographically related and manipulate the geographically represented data. The interface may provide a link diagram 908 for depicting the relationships between various entities stored by the database.

In an exemplary embodiment, the interface may provide a tabbed window 910 for a time wheel, a text extraction tool, an advanced search tool and a media viewer. The media viewer may display media with corresponding entities associated with the media. According to an exemplary embodiment, the interface may provide a media browser 912 for a user to view thumbnails of imagery intelligence. The interface may also include a properties area 914 for users to view and change the properties stored within the database, such as, e.g., but not limited to properties of entities and imagery data.

Figure 10:
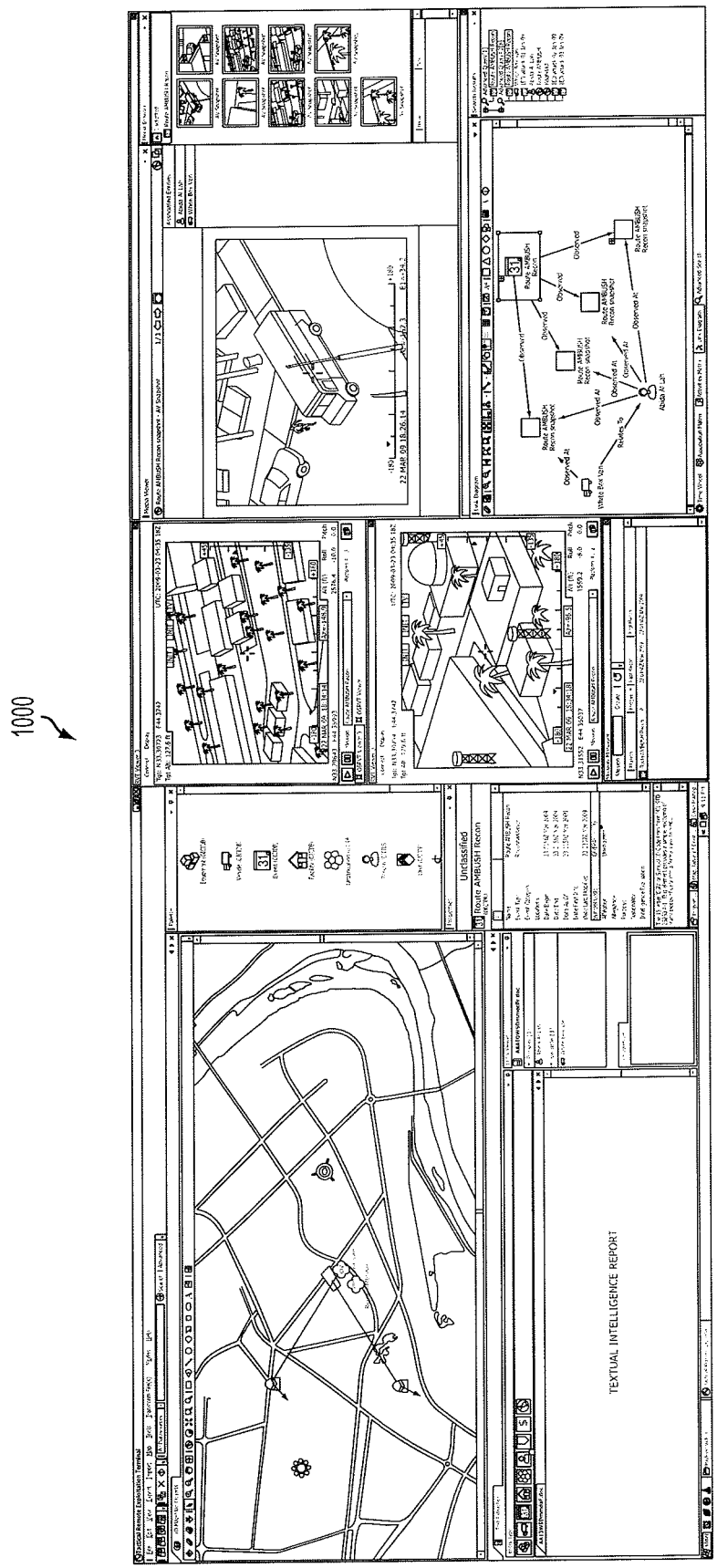
FIG. 10 depicts an exemplary alternate view of an interface of the terminal of the system in accordance with exemplary embodiments.

FIG. 10 depicts an exemplary alternate view of an interface 1000 of the terminal of the system in accordance with exemplary embodiments. According to an exemplary embodiment, the interface may allow video viewers to be configured for as many platforms as there are feeds for. In an exemplary embodiment, the toolbox components may be arranged by the user to create custom views. The custom views may be saved and restored. In an exemplary embodiment, the interface may provide full integration with an Analysis and eXploration of Information Sources (AXIS) Pro tool to provide a common map with intelligence from AXIS Pro sources, such as, e.g., but not limited to, Distributed Common Ground System-Army (DCGS-A), and/or Prophet, etc. According to an exemplary embodiment, a multiple display user configured view may show two live remote sensor feeds, a snapshot browser, a snapshot viewer, a link analysis tool, a text extraction tool, and a map showing sensor telemetry.

Figure 11:
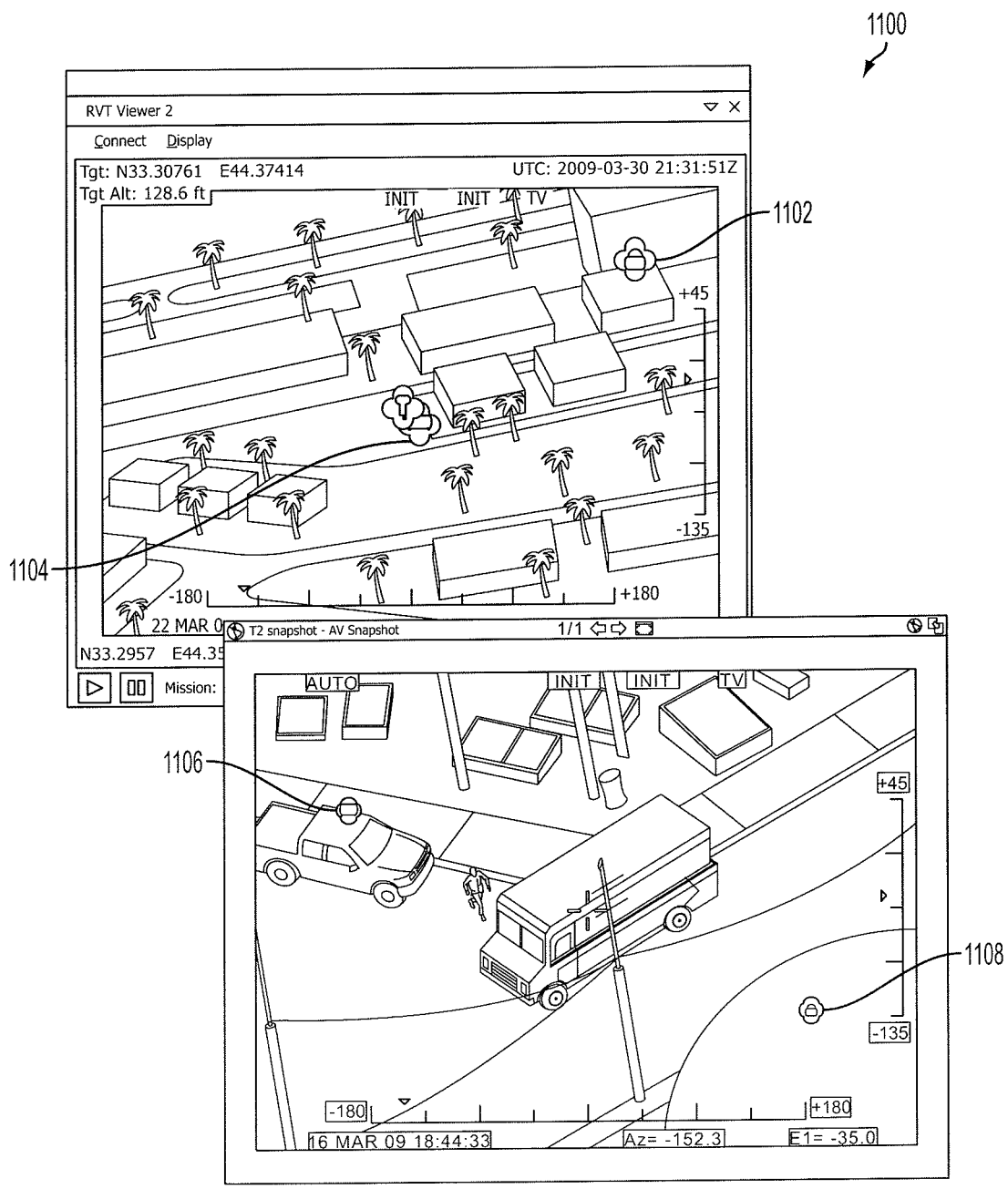
FIG. 11 depicts an exemplary view of an interface of the terminal providing symbol overlay in accordance with exemplary embodiments.

FIG. 11 depicts an exemplary view of an interface 1100 of the terminal providing symbol overlay in accordance with exemplary embodiments. According to an exemplary embodiment, entities 1102, 1104, 1106, and 1108 from the database may be overlaid on video and snapshots. In an exemplary embodiment, entities 1102, 1104, 1106, and 1108 may move around as the sensor video pans based on geo-spatial calculations. Overlaid entities 1102, 1104, 1106, and 1108 may have adjustable transparency and may be hide-able. In an exemplary embodiment, entities 1102, 1104, 1106, and 1108 may be selected and moved around by the user, and the movements may update the entity's locations in the database. Entity selections may propagate to other aspects of the terminal, such as, e.g., but not limited to, the properties editor and the map, etc.

Figure 12:
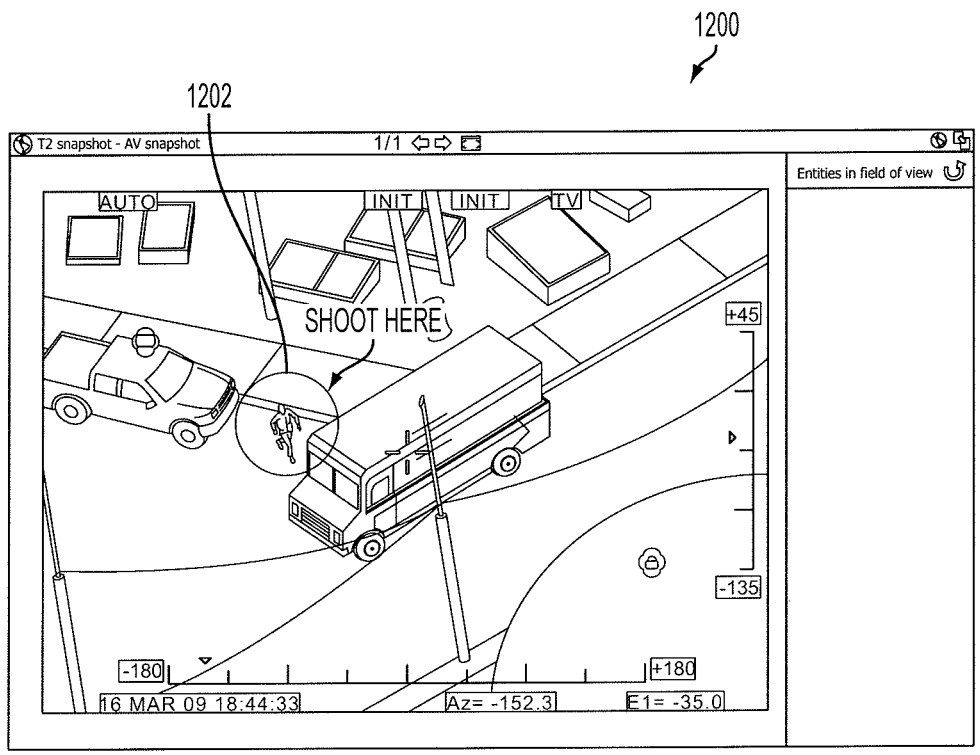
FIG. 12 depicts an exemplary view of an interactive interface of the terminal providing imagery annotation in accordance with exemplary embodiments.

FIG. 12 depicts an exemplary view of an interactive interface 1200 of the terminal providing imagery annotation 1202 in accordance with exemplary embodiments. According to an exemplary embodiment, the interface 1200 may provide for non-destructive imagery annotation. In an exemplary embodiment, annotation 1202 may include, such as, e.g., but not limited to, drawing, typing, stamping, labeling, including arrows, including shapes, etc. The interface 1200 may provide an annotation transparency control for controlling the transparency of annotations. The interface 1200 may provide hide, show, edit, and delete annotation capability. The interface 1200 may provide annotation of videos.

Figure 13:
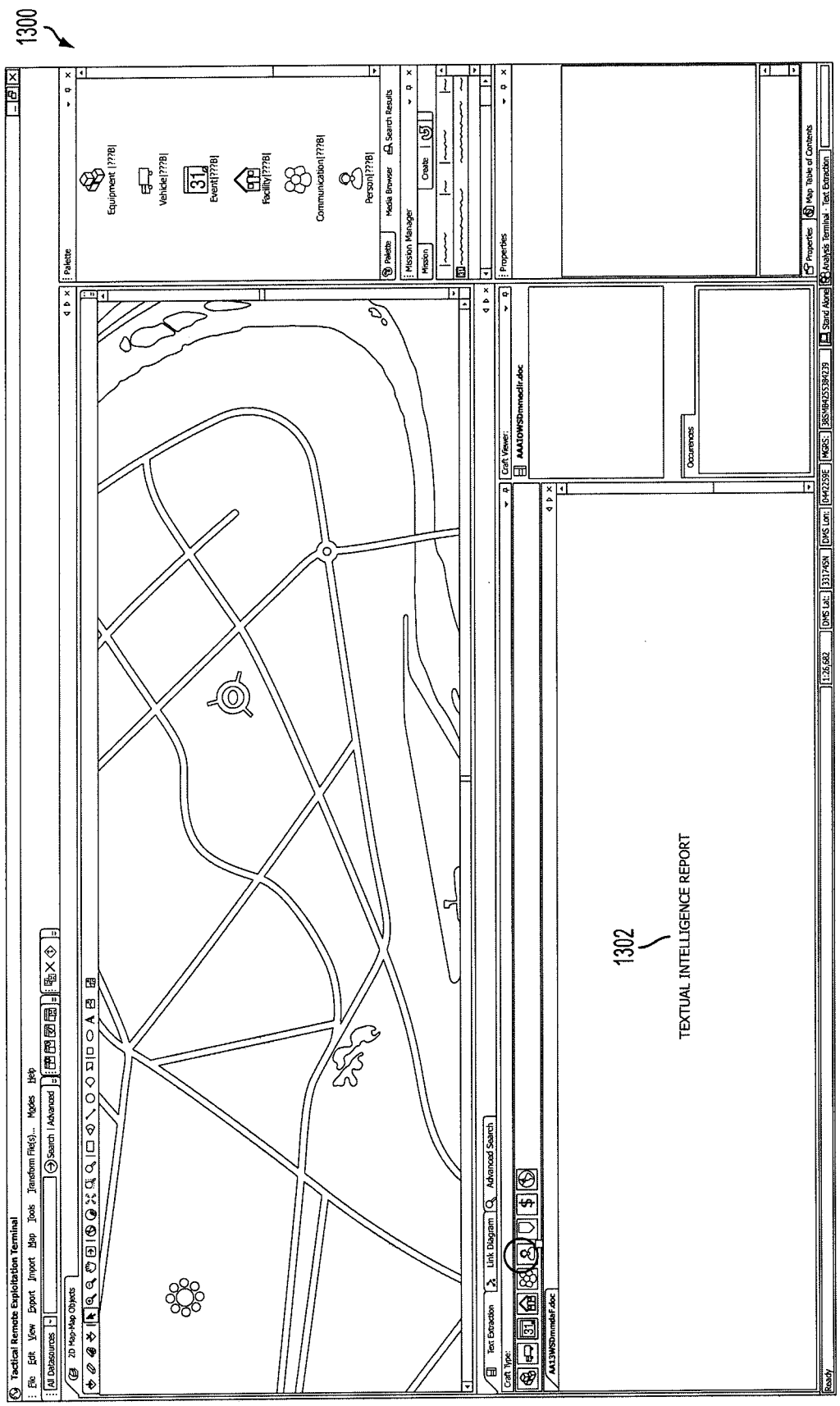
FIG. 13 depicts an exemplary view of a text extraction tool of an interface of the terminal in accordance with exemplary embodiments.

FIG. 13 depicts an exemplary view of a text extraction tool of an interface 1300 of the terminal in accordance with exemplary embodiments. According to an exemplary embodiment, the terminal may receive intelligence reports 1302. An intelligence report 1302 may be, for example, an intelligence report 1302 from a checkpoint documenting that a terrorist has been spotted at a checkpoint in a particular vehicle. According to an exemplary embodiment, the text extraction tool of the terminal may allow a user to view the report and create database entities for items of interest based on the information in the report 1302. In an exemplary embodiment, the entities may be created by highlighting particular text and dragging and dropping the selections to various locations, such as, e.g.; but not limited to, icons representing particular types of entities, property fields of existing entities, etc.

According to an exemplary embodiment, after an entity is created, a user may use the properties editor to view and modify the properties of an entity. In an exemplary embodiment, properties of a vehicle entity may include, quantity of equipment, speed, course, VIN, year, make, model, license number, and/or color, etc.

Figure 14:
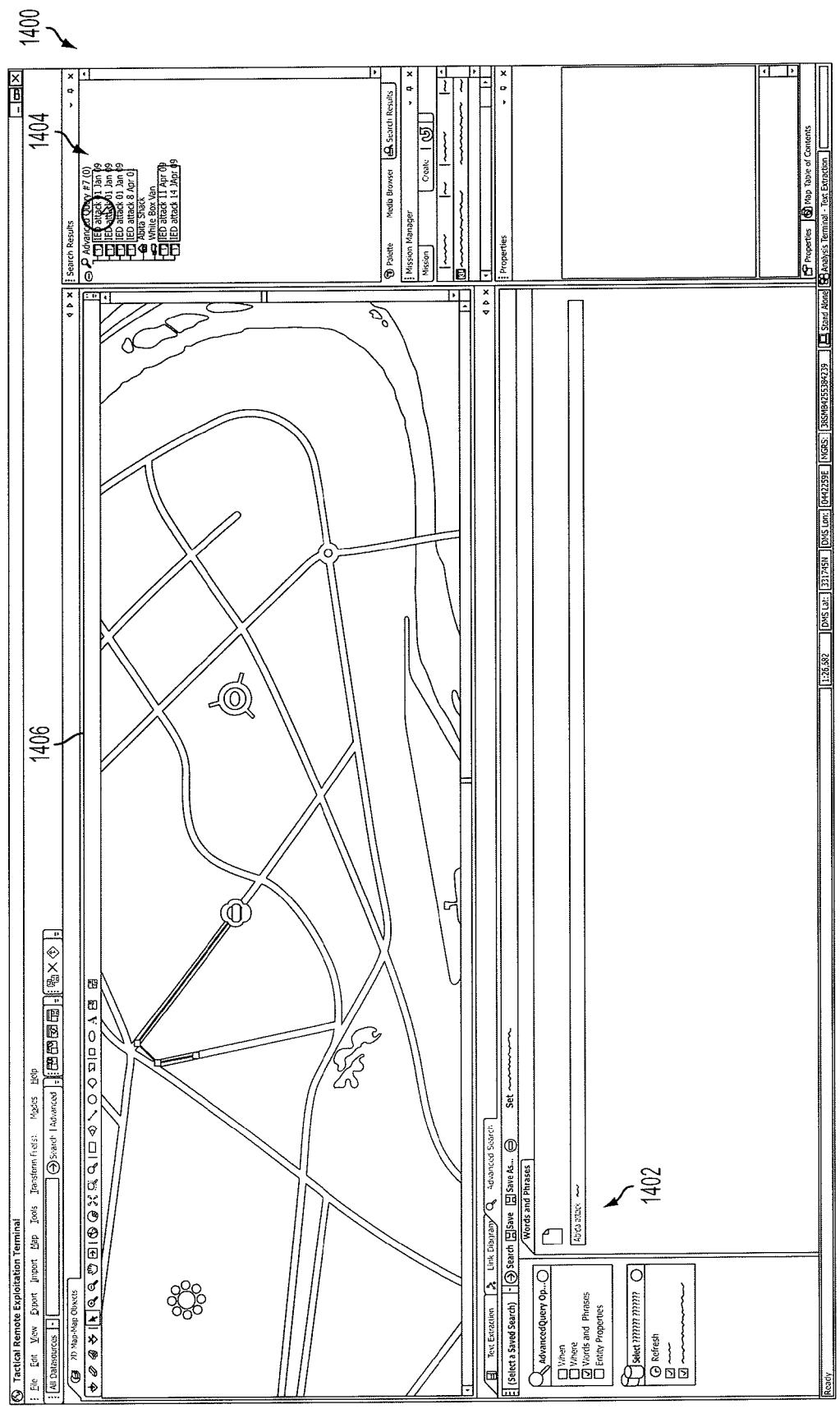
FIG. 14 depicts an exemplary view of an interface of the terminal of the system which may support searches and manipulation of entities in accordance with exemplary embodiments.

FIG. 14 depicts an exemplary view of an interface 1400 of the terminal of the system which may support searches and manipulation of entities in accordance with exemplary embodiments. According to an exemplary embodiment, entities of the database may be stored in a searchable relational database. In an exemplary embodiment, the terminal may provide a search tool 1402 for a user to search the database using custom queries, such as, e.g., but not limited to a textual query. Entities retrieved from a query 1404 may be placed on a map using simple drag and drop operations. In an exemplary embodiment, a vehicle entity may be retrieved from a search and may be placed on the map. The previous locations of the vehicle entity may be selected to be displayed on the map. Other entities such as the locations of attack events and/or the last known location of a person may be placed on the map.

Figure 15:
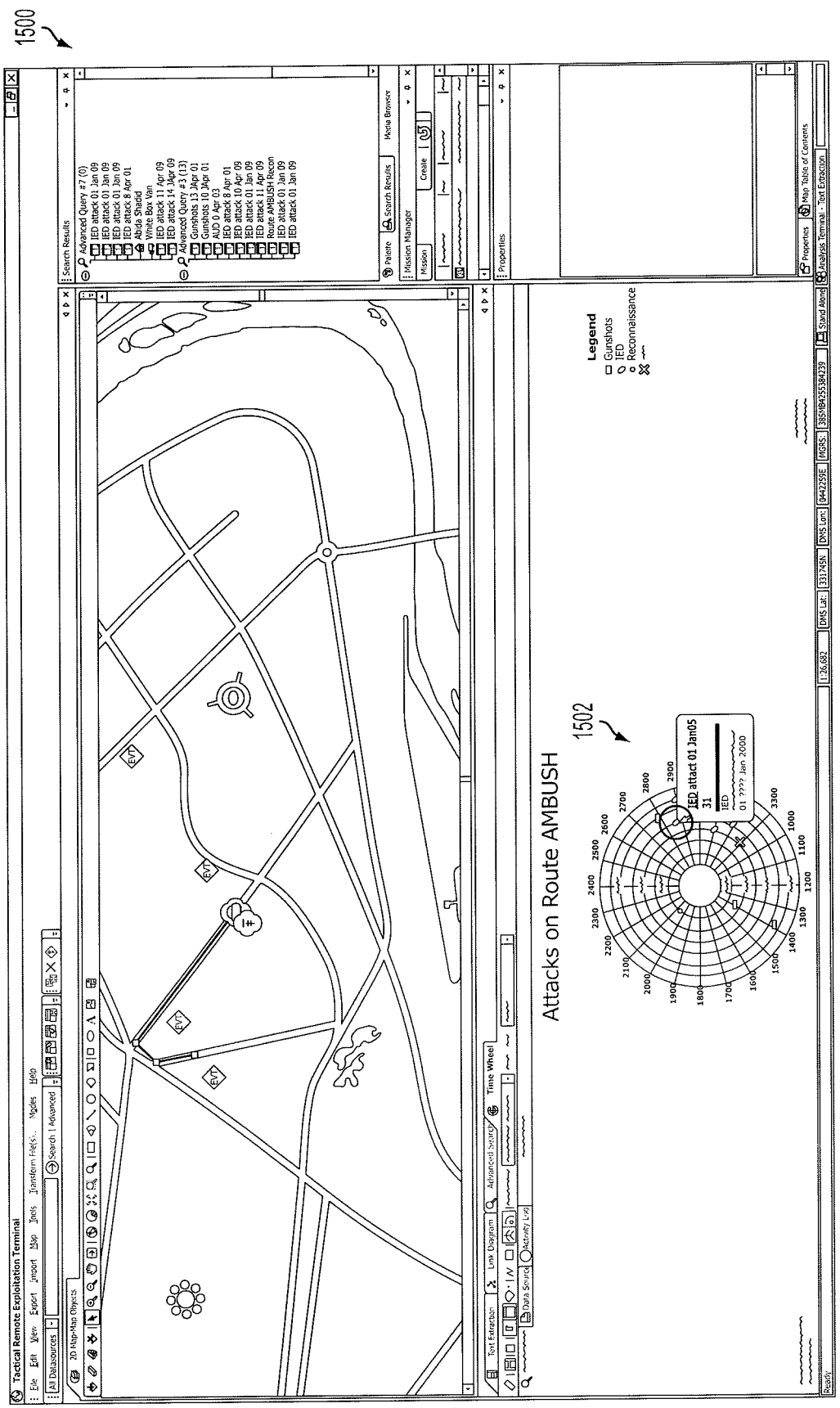
FIG. 15 depicts an exemplary time wheel of an interface of the terminal of the system in accordance with exemplary embodiments.

FIG. 15 depicts an exemplary time wheel of an interface 1500 of the terminal of the system in accordance with exemplary embodiments. According to an exemplary embodiment, the terminal may provide a time wheel 1502 for analyzing the temporal relationship between events, such as, e.g., but not limited to, attack ambush events on a route. In an exemplary embodiments, event entities may be dragged and dropped onto the time wheel tool 1502.

According to an exemplary embodiment, a link analysis diagram may be created based on the entities on a map. Intelligence imagery may be displayed on the interface in real time. According to an exemplary embodiment, the interface may allow a user to take snapshots of live imagery, which may be automatically associated using the aforementioned methods previously described.

According to an exemplary embodiment, the media browser may display snapshots associated with a currently selected entity. Selecting a snapshot in the media browser may open a larger image of the snapshot in the media viewer, which may provide a full screen view allowing a more detailed examination of the image. According to an exemplary embodiment, the field of view of a snapshot, or foot print, may be displayed on the map, providing a spatial context for imagery analysis. In an exemplary embodiment, the media viewer may also display entities associated with the image, and may allow the user to search for entities associated with the image.

According to an exemplary embodiment, the user may manually create relationships between entities and intelligence imagery. Entities may be identified by a user in the image. According to an exemplary embodiment, entities may be dragged and dropped onto a displayed image. In an exemplary embodiment, relationships may also be created through the link analysis tool, link diagram, or other components.

According to an exemplary embodiment, selecting an entity in any component may display associated imagery in the media browser. The interface may allow a user to view all imagery related to an entity independent of the source of the imagery, such as the platform that originally captured the image.

According to an exemplary embodiment, the relationships between entities may be explored and navigated following their links.

According to an exemplary embodiment, the system may integrate Tactical Ops (TACOPS) AXIS Pro Intelligence analysis suite and may provide a fusion of intelligence from multiple data sources, capture of live remote sensor Intelligence to AXIS Pro database, geospatial analysis, link analysis, temporal & pattern analysis, and activities & association matrix analysis.

According to an exemplary embodiment, the terminal may be based on a TACOPS Viper application framework and may be developed in C#.NET.

In an exemplary embodiment, the terminal may also support creation of video clips based on the intelligence imagery received.

Figure 16:
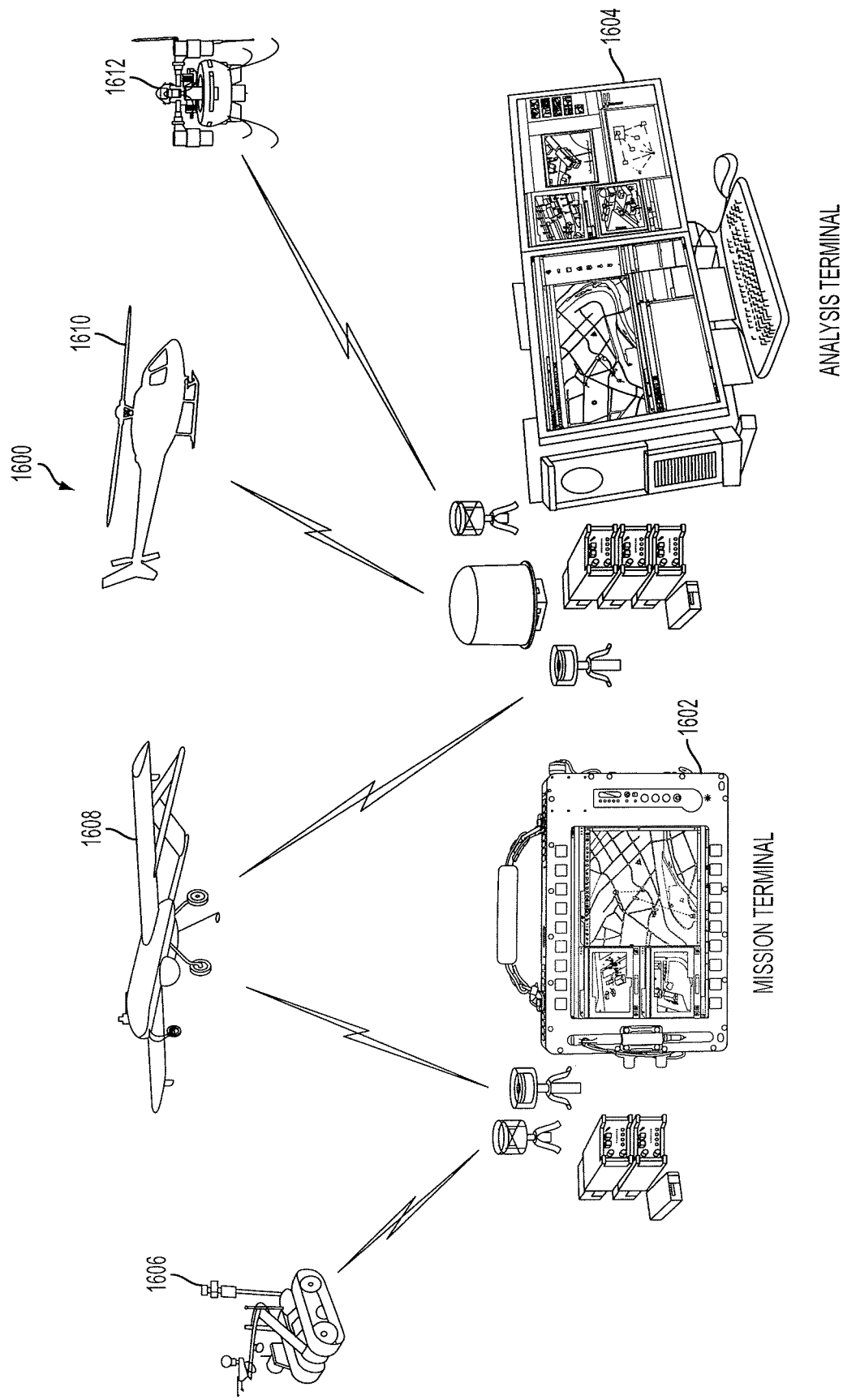
FIG. 16 depicts an exemplary diagram of a system of unmanned aerial vehicle with a portable and stationary terminal in accordance with exemplary embodiments.

FIG. 16 depicts an exemplary diagram 1600 of a system of unmanned aerial vehicle with a portable terminal 1602 and analysis terminal 1604 in accordance with exemplary embodiments. According to an exemplary embodiment, the system may include a variety of different types of remote sensors, such as, e.g., but not limited to unmanned ground vehicles 1606, unmanned aerial vehicles 1608, helicopters 1610, hover vehicles 1612, and stationary sensing equipment. In an exemplary embodiment, the intelligence information from the vehicles may be provided to a portable mission terminal 1602 or an analysis terminal 1604. In an exemplary embodiment, the analysis terminal 1604 may be a stationary high performance analysis workstation or may be mobile. According to an exemplary embodiment, the portable mission terminal 1602 may be a vehicle mounted live intelligence terminal.

Figure 17:
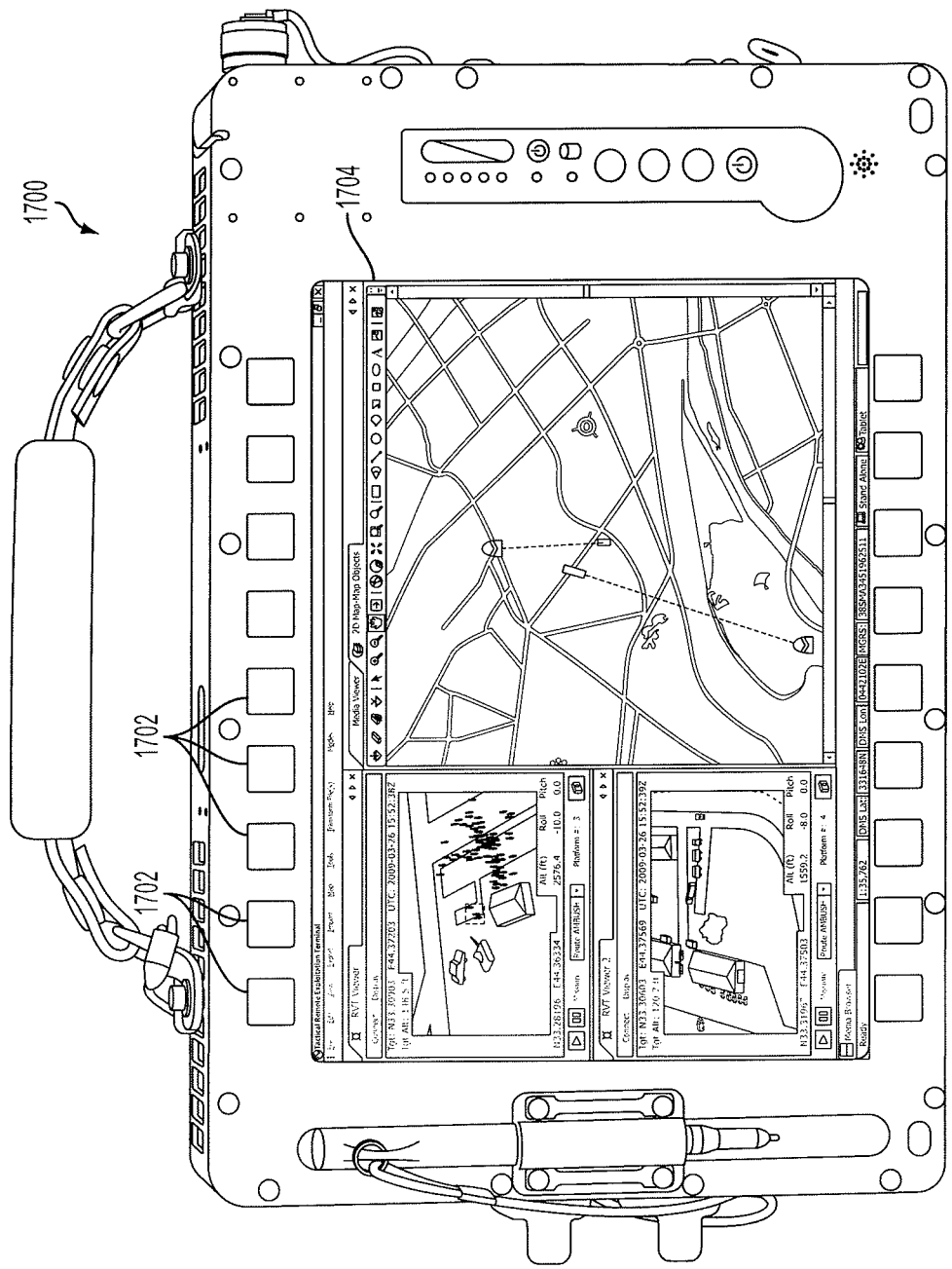
FIG. 17 depicts an exemplary view of a portable terminal of the system in accordance with exemplary embodiments.

FIG. 17 depicts an exemplary view of a portable mission terminal 1700 of the system in accordance with exemplary embodiments. According to an exemplary embodiment, the portable mission terminal may have hardware bezel buttons 1702 around the screen 1704. In an exemplary embodiment, the portable mission terminal user interface may be tailored for use with these buttons. The portable mission terminal may have a multi-function display (MFD) style user interface. In an exemplary embodiment, primary interactions may be through bezel buttons or very large soft buttons which may appear on the screen when needed. According to an exemplary embodiment, different functions may be separated into tab pages and bezel buttons may switch between tabs. User interactions may be designed for use by a soldier who is in a moving platform and is wearing gloves (i.e., fat fingers, no stylus). According to an exemplary embodiment, the portable mission terminal may include an on-board Selective Availability/Anti-Spoofing Module (SAASM) for determining the current position of the portable mission terminal and/or displaying the position of the portable mission terminal on a map.

Figure 18:
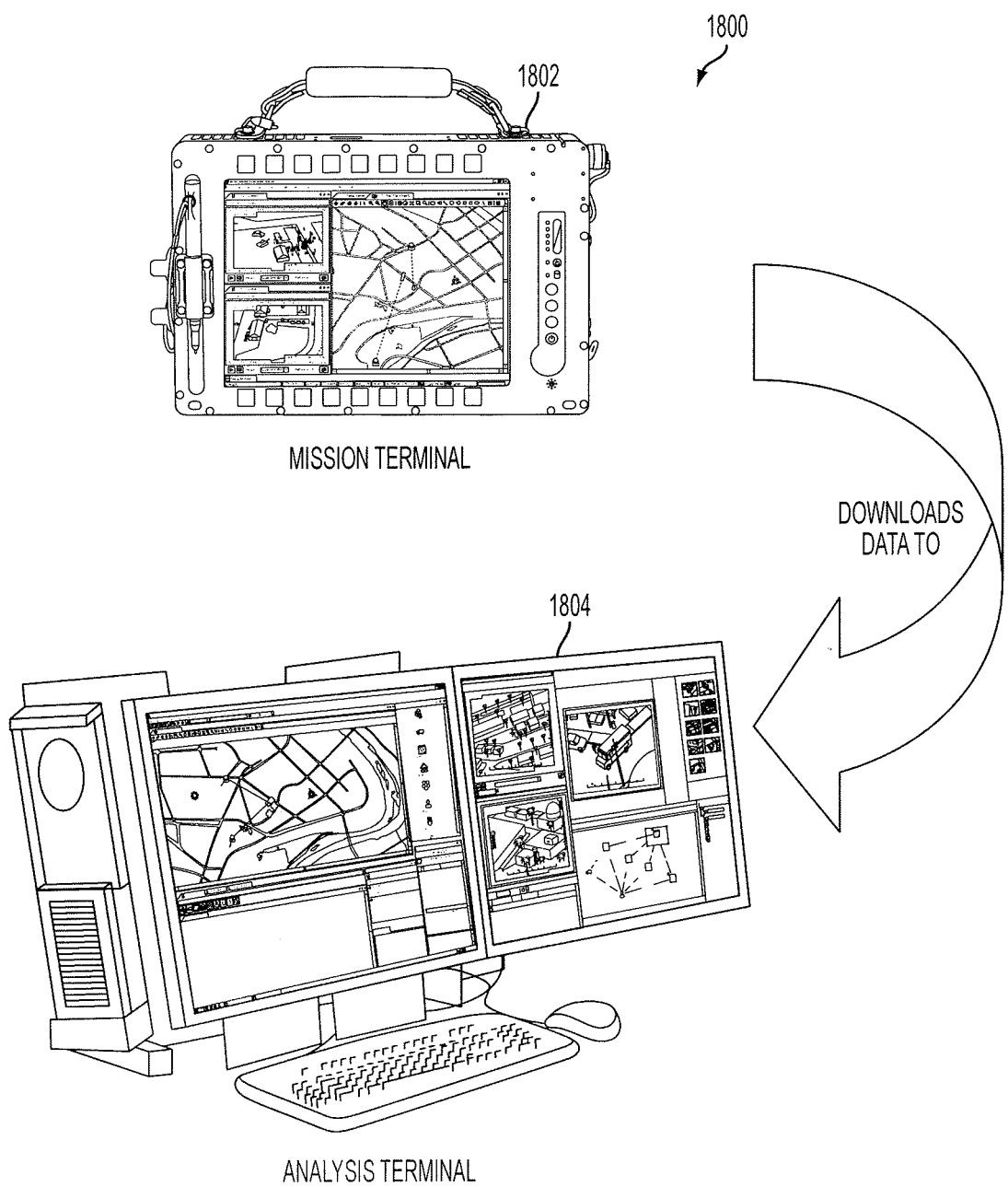
FIG. 18 depicts an exemplary diagram of the flow of information between a portable terminal and a stationary terminal in accordance with exemplary embodiments.

FIG. 18 depicts an exemplary diagram 1800 of the flow of information between a portable terminal 1802 and a stationary terminal 1804 in accordance with exemplary embodiments. According to an exemplary embodiment, the portable mission terminal 1802 may work together with an analysis terminal 1804 to provide end-to-end intelligence collection and analysis. In an exemplary mission scenario, a soldier may pre-load the portable mission terminal 1802 with database entities specific to the current mission. The soldier may perform mission and use the portable mission terminal 1802 to collect live intelligence. In an exemplary embodiment, post-mission, the soldier may download the database from the portable mission terminal 1802 to the analysis terminal 1804. An analyst may use the analysis terminal 1804 to mine the data for knowledge. In an exemplary embodiment, the data from the portable mission terminal 1802 may be automatically downloaded to the analysis terminal 1804.

Figure 20:
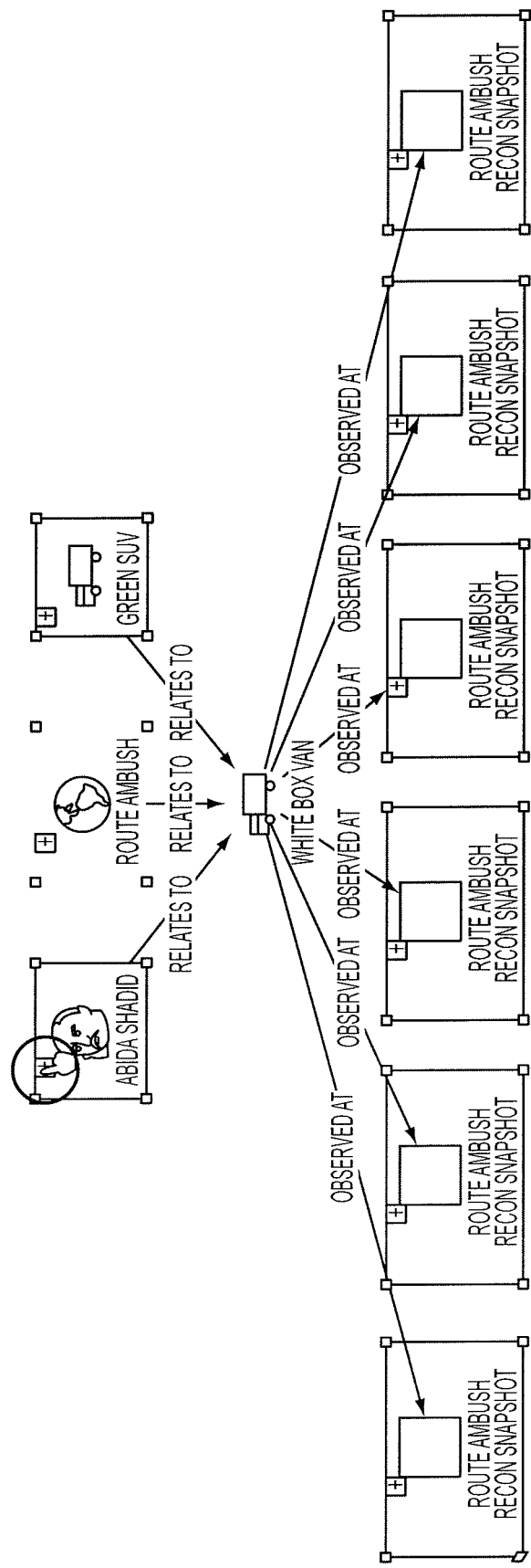
FIG. 20 depicts an exemplary diagram of a relationship diagram depicted by an interface of the terminal in accordance with the present embodiments.
Figure 21:
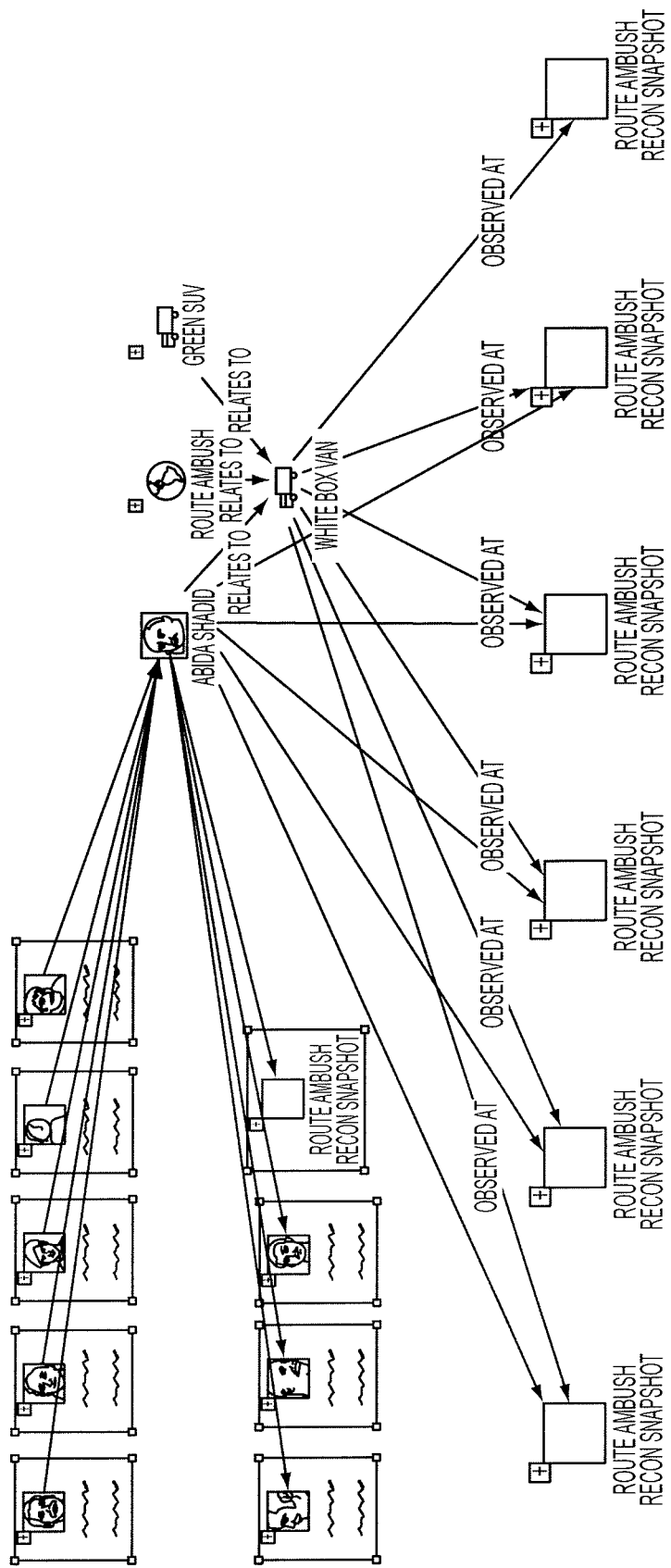
FIG. 21 depicts an exemplary expanded diagram of a relationship diagram depicted by an interface of the terminal in accordance with the present embodiments.
Figure 22:
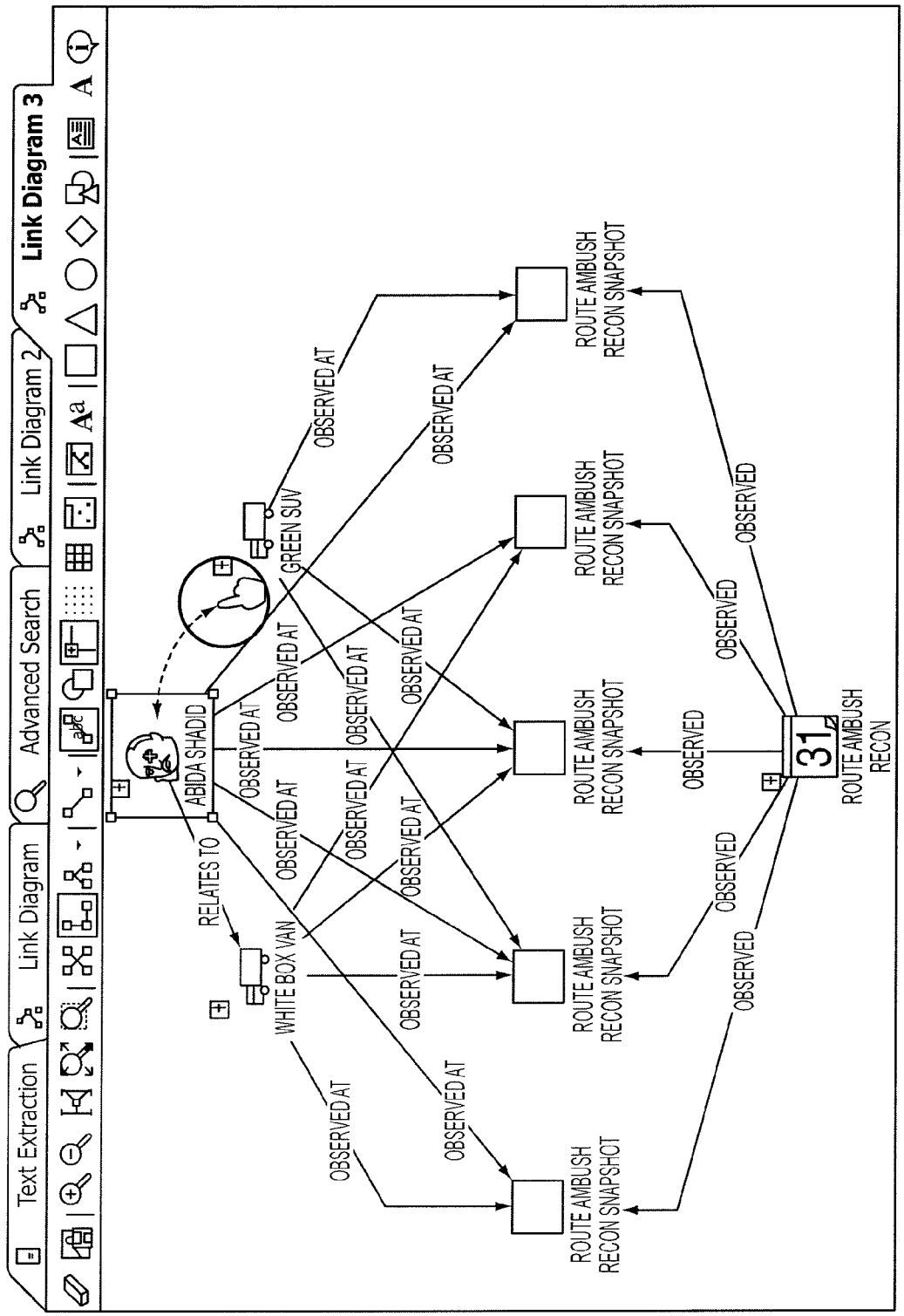
FIG. 22 depicts an exemplary diagram of the creation of a relationship in a relationship diagram depicted by an interface of the terminal in accordance with the present embodiments.
Figure 23:
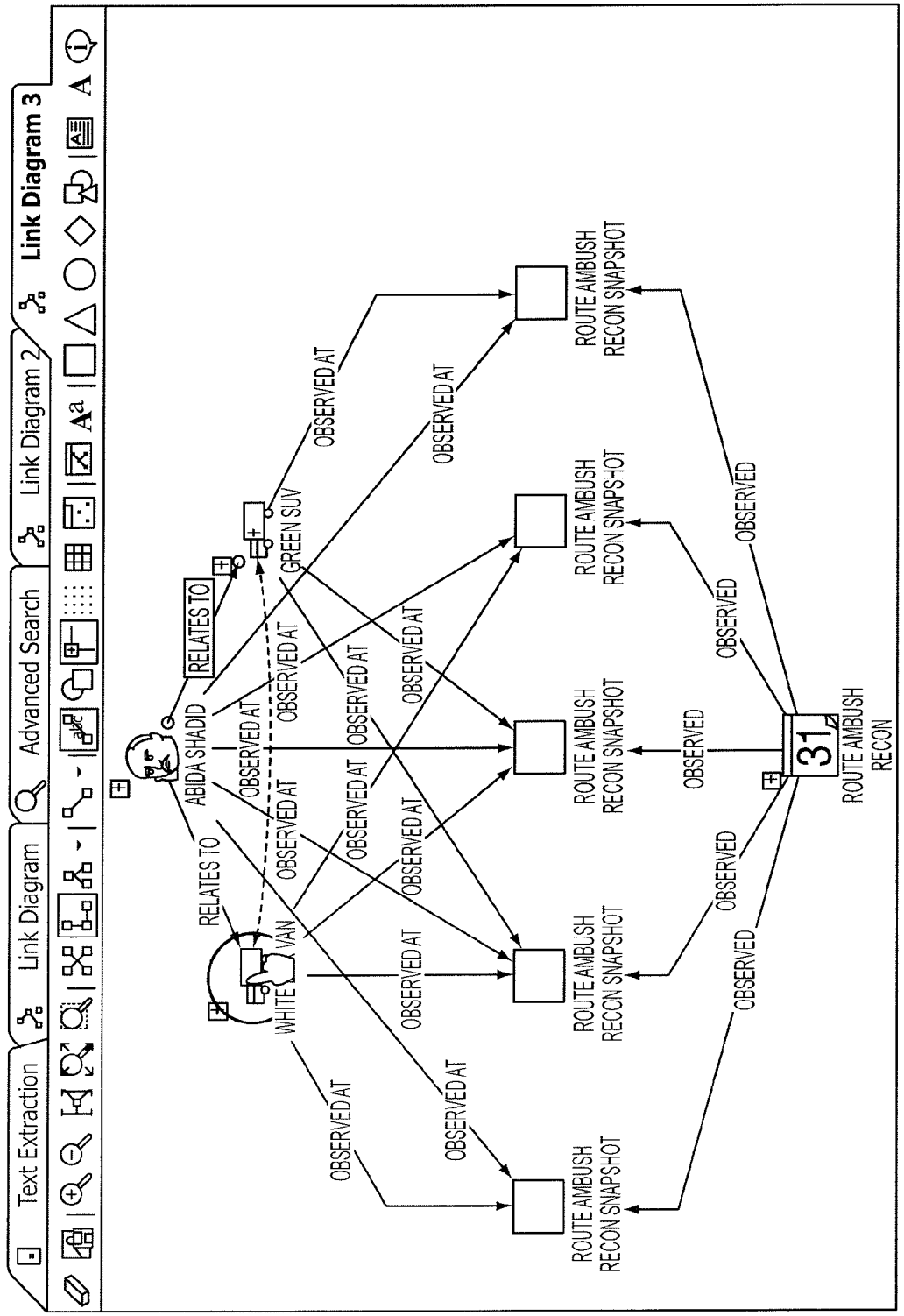
FIG. 23 depicts an exemplary diagram of an exemplary result of a creation of a relationship in a relationship diagram depicted by an interface of the terminal in accordance with the present embodiments.
Figure 24:
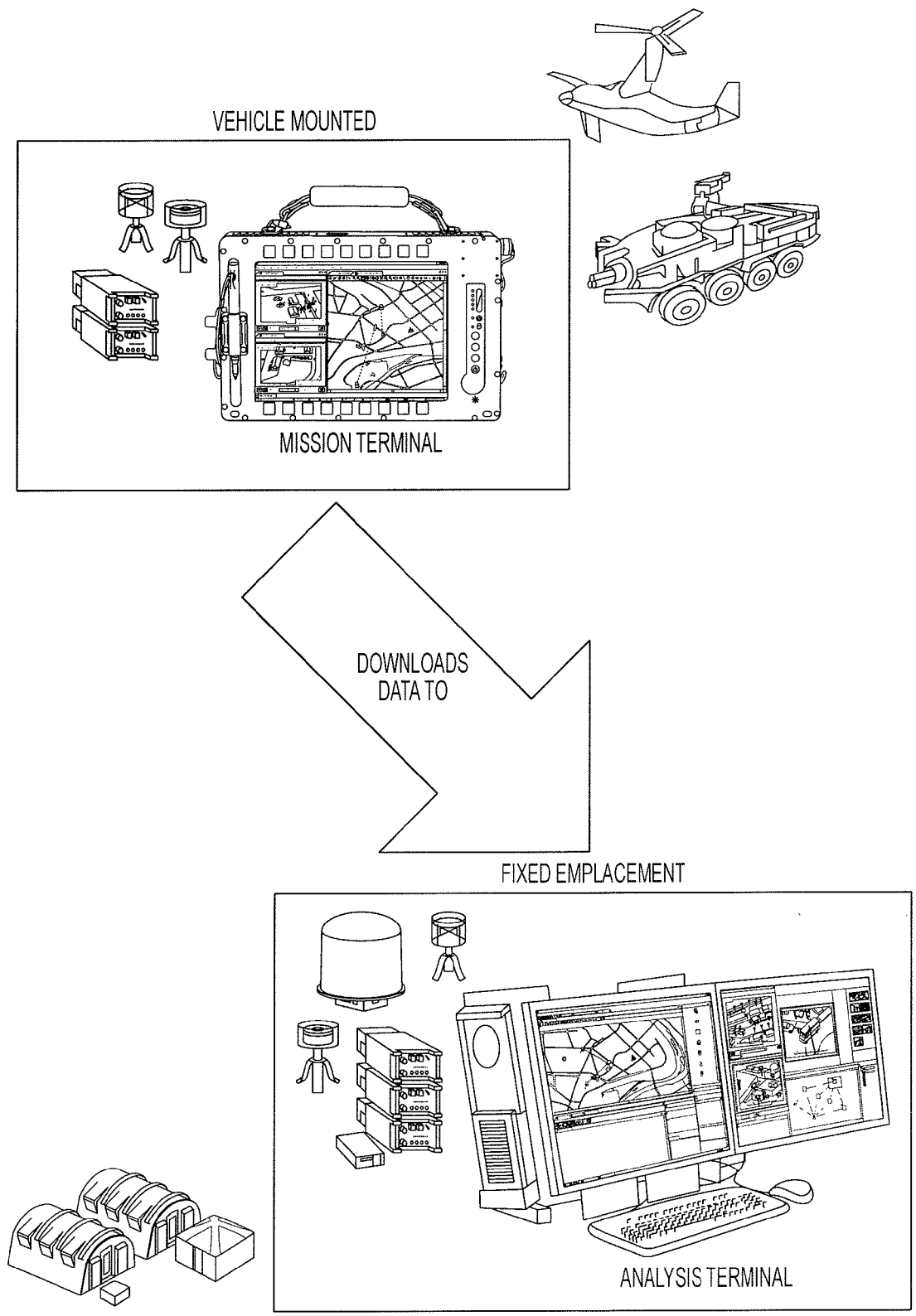
FIG. 24 depicts an exemplary diagram of hardware types of the system in accordance with the present embodiments.
Figure 25:
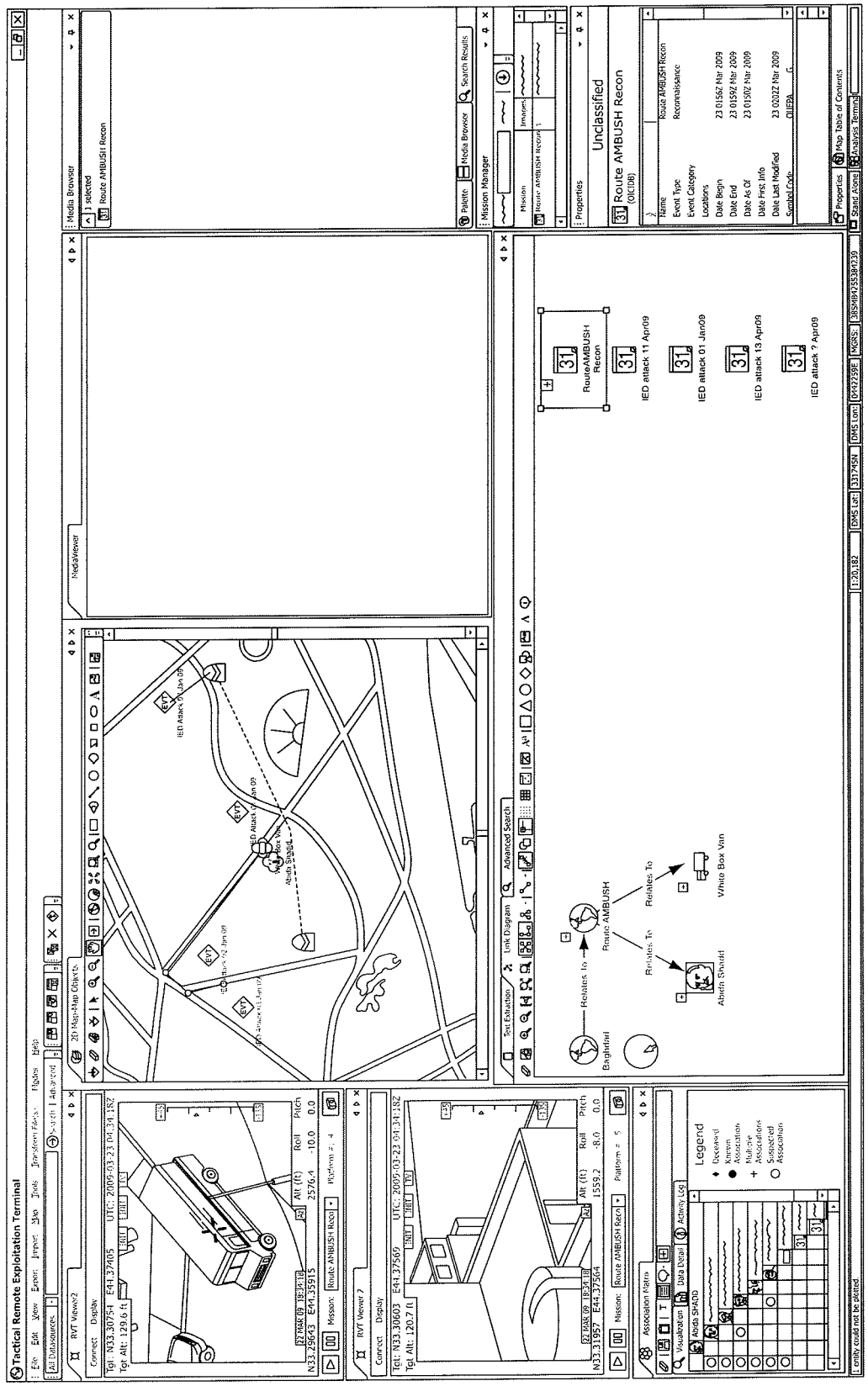
FIG. 25 depicts an exemplary diagram of an interface of the terminal depicting a link diagram displaying relationships between various entities.
Figure 26:
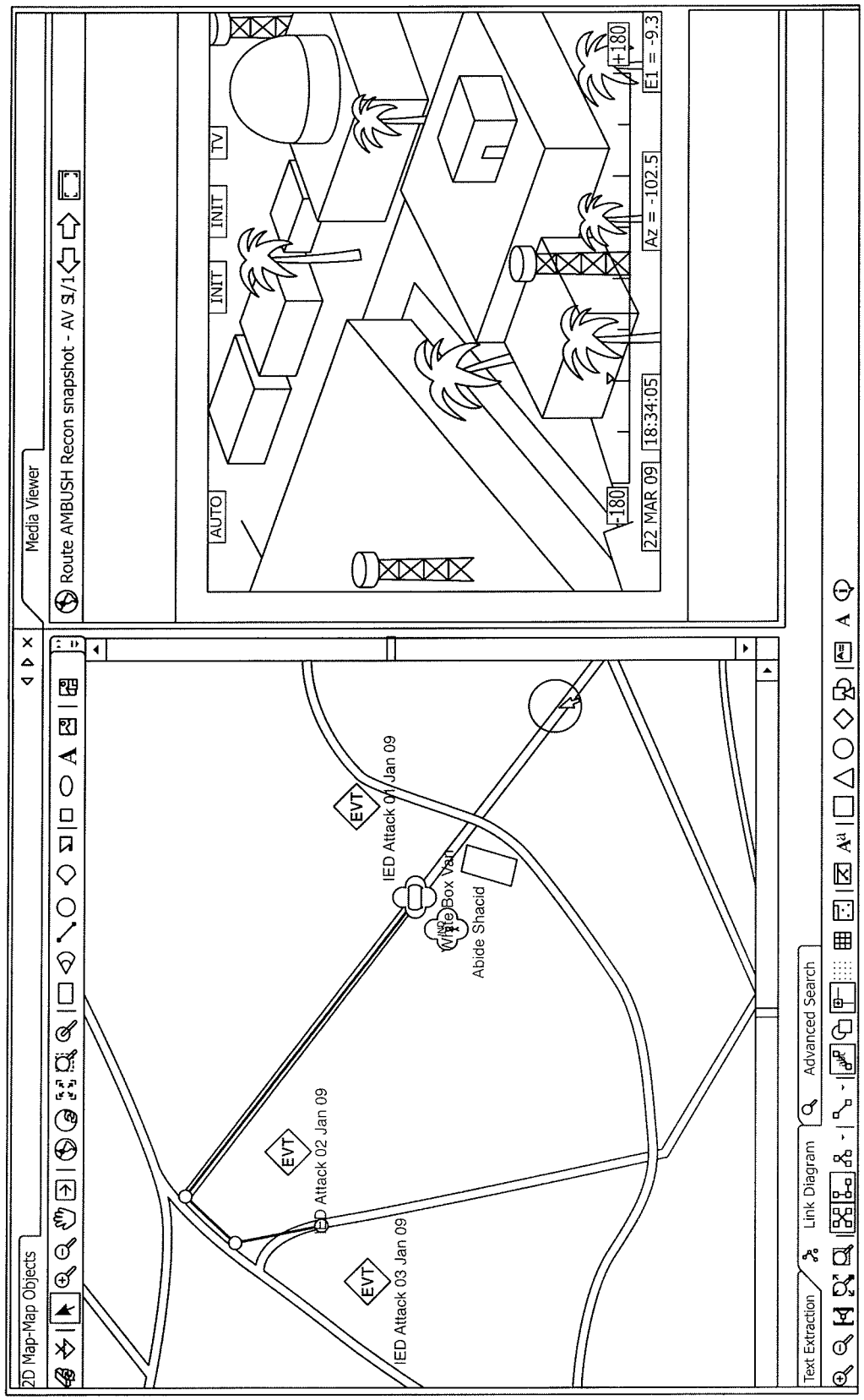
FIG. 26 depicts an exemplary diagram of a detailed view of a map of the interface of the terminal representing entities and the field of view of an image.

FIGS. 20-26 provide additional exemplary embodiments of the above noted features and functions of the present invention. FIG. 20 depicts an exemplary diagram of a relationship diagram depicted by an interface of the terminal in accordance with the present embodiments. According to an exemplary embodiment, FIG. 21 depicts an exemplary expanded diagram of a relationship diagram depicted by an interface of the terminal in accordance with the present embodiments. FIG. 22 depicts an exemplary diagram of the creation of a relationship in a relationship diagram depicted by an interface of the terminal in accordance with the present embodiments. FIG. 23 depicts an exemplary diagram of an exemplary result of a creation of a relationship in a relationship diagram depicted by an interface of the terminal in accordance with the present embodiments. FIG. 24 depicts an exemplary diagram of hardware types of the system in accordance with the present embodiments. According to an exemplary embodiment, the hardware may be vehicle mounted or may be fixed emplacement hardware. FIG. 25 depicts an exemplary diagram of an interface of the terminal depicting a link diagram displaying relationships between various entities. According to an exemplary embodiment, the entities may represent individuals, vehicles, missions, events, and/or locations. FIG. 26 depicts an exemplary diagram of a detailed view of a map of the interface of the terminal representing entities and the field of view of an image. According to an exemplary embodiment, the field of view of an image may be represented by a white shaded area on the map.

Exemplary Communications Embodiments

Figure 19:
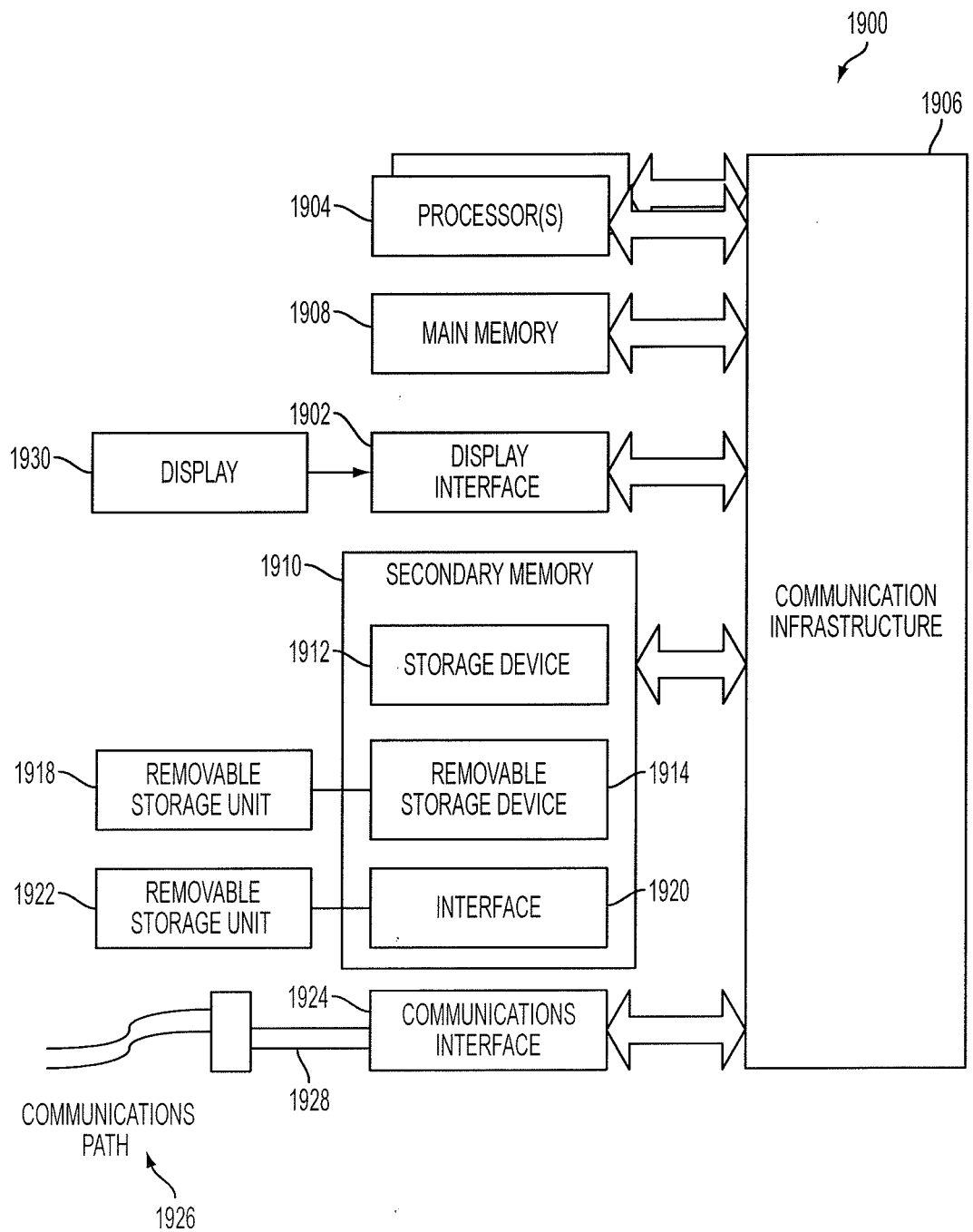
FIG. 19 depicts an exemplary embodiment of a computer system that may be used in association with, in connection with, and/or in place of certain components in accordance with the present embodiments.

FIG. 19 depicts an exemplary embodiment of a computer system 1900 that may be used in association with, in connection with, and/or in place of, but not limited to, any of the foregoing components and/or systems. In an exemplary embodiment, the computer system represents an implementation of one or more of the components of FIG. 3. According to an exemplary embodiment, the terminal may be implemented using a computer system. In another embodiment, computer readable program code for causing a computer system to perform a method for automated collection and correlation for tactical information may be stored in computer readable medium of a computer system.

The present embodiments (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 1900 is shown in FIG. 19, depicting an exemplary embodiment of a block diagram of an exemplary computer system useful for implementing the present invention. Specifically, FIG. 19 illustrates an example computer 1900, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/, etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 1900 is shown in FIG. 19. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 19.

The computer system 1900 may include one or more processors, such as, e.g., but not limited to, processor(s) 1904. The processor(s) 1904 may be connected to a communication infrastructure 1906 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 1900 may include a display interface 1902 that may forward, e.g., but not limited to, graphics, text, and other data, etc., from the communication infrastructure 1906 (or from a frame buffer, etc., not shown) for display on the display unit 1930.

The computer system 1900 may also include, e.g., but may not be limited to, a main memory 1908, random access memory (RAM), and a secondary memory 1910, etc. The secondary memory 1910 may include, for example, (but not limited to) a hard disk drive 1912 and/or a removable storage drive 1914, representing a floppy diskette drive, a magnetic tape drive, an optical disk drive, a compact disk drive CD-ROM, etc. The removable storage drive 1914 may, e.g., but not limited to, read from and/or write to a removable storage unit 1918 in a well known manner. Removable storage unit 1918, also called a program storage device or a computer program product, may represent, e.g., but not limited to, a floppy disk, magnetic tape, optical disk, compact disk, etc. which may be read from and written to by removable storage drive 1914. As will be appreciated, the removable storage unit 1918 may include a computer usable storage medium having stored therein computer software and/or data.

In alternative exemplary embodiments, secondary memory 1910 may include other similar devices for allowing computer programs or other instructions to be loaded into computer system 1900. Such devices may include, for example, a removable storage unit 1922 and an interface 1920. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 1922 and interfaces 1920, which may allow software and data to be transferred from the removable storage unit 1922 to computer system 1900.

Computer 1900 may also include an input device such as, e.g., (but not limited to) a mouse or other pointing device such as a digitizer, and a keyboard or other data entry device (none of which are labeled).

Computer 1900 may also include output devices, such as, e.g., (but not limited to) display 1930, and display interface 1902. Computer 1900 may include input/output (I/O) devices such as, e.g., (but not limited to) communications interface 1924, cable 1928 and communications path 1926, etc. These devices may include, e.g., but not limited to, a network interface card, and modems (neither are labeled). Communications interface 1924 may allow software and data to be transferred between computer system 1900 and external devices. Examples of communications interface 1924 may include, e.g., but may not be limited to, a modem, a network interface (such as, e.g., an Ethernet card), a communications port, a Personal Computer Memory Card International Association (PCMCIA) slot and card, etc. Software and data transferred via communications interface 1924 may be in the form of signals 1928 which may be electronic, electromagnetic, optical or other signals capable of being received by communications interface 1924. These signals 1928 may be provided to communications interface 1924 via, e.g., but not limited to, a communications path 1926 (e.g., but not limited to, a channel). This channel 1926 may carry signals 1928, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 1914, a hard disk installed in hard disk drive 1912, and signals 1928, etc. These computer program products may provide software to computer system 1900. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Computer programs (also called computer control logic), may include object oriented computer programs, and may be stored in main memory 1908 and/or the secondary memory 1910 and/or removable storage units 1914, also called computer program products. Such computer programs, when executed, may enable the computer system 1900 to perform the features of the present invention as discussed herein. In particular, the computer programs, when executed, may enable the processor 1904 to provide a method to resolve conflicts during data synchronization according to an exemplary embodiment of the present invention. Accordingly, such computer programs may represent controllers of the computer system 1900.

In another exemplary embodiment, the invention may be directed to a computer program product comprising a computer readable medium having control logic (computer software) stored therein. The control logic, when executed by the processor 1904, may cause the processor 1904 to perform the functions of the invention as described herein. In another exemplary embodiment where the invention may be implemented using software, the software may be stored in a computer program product and loaded into computer system 1900 using, e.g., but not limited to, removable storage drive 1914, hard drive 1912 or communications interface 1924, etc. The control logic (software), when executed by the processor 1904, may cause the processor 1904 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G wireless, Bluetooth, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB), etc.

Bluetooth is an emerging wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless Ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11a, b, d and g, (including, e.g., but not limited to IEEE 802.11g-2003, etc.), etc.

CONCLUSION

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method for automated collection and correlation for tactical information, the method comprising:
    receiving, by one or more processors, information for a plurality of entities, wherein the information includes geo-spatial information;

storing, by the one or more processors, the information for the plurality of entities in a database;

receiving, by the one or more processors, imagery and data collected from one or more remote sensors;

storing, by the one or more processors, the imagery and the data from one or more remote sensors;

determining, by the one or more processors, a field of view of the imagery based on geo-spatial information regarding the one or more remote sensors sensing the imagery;

retrieving, by the one or more processors, the geo-spatial information of the plurality of entities;

comparing, by the one or more processors, the geo-spatial information of the plurality of entities with the field of view of the imagery to determine if one or more of the plurality of entities are within the field of view;

automatically creating, by the one or more processors, a relationship between the imagery at a time that the one or more of the plurality of entities are within the field of view and the one or more of the plurality of entities within the field of view;

storing, by the one or more processors, the relationship between the imagery at the time that the entity is within the field of view and the one or more of the plurality of entities within the field of view in the database calculating, by the one or more processors, an association matrix between the plurality of entities, the association matrix calculated using the information for the plurality of entities, the relationship, the imagery, and the data from one or more remote sensors;

displaying, by the one or more processors, a link diagram of the plurality of entities based on the association matrix between the plurality of entities; and displaying, by the one or more processors, video received from the one or more remote sensors with one or more of the plurality of entities overlaid on the displayed video.

2. The method of claim 1, further comprising calculating geo-spatial information of one or more of the plurality of entities.

3. The method of claim 1, further comprising:
receiving geo-spatial information of the imagery from the one or more remote sensors.

4. The method of claim 1, wherein the one or more remote sensors comprise an unmanned aerial vehicle (UAV).

5. The method of claim 1, wherein said imagery comprises at least one of video clips or snapshots.

6. The method of claim 5, further comprising:
capturing imagery with a remote sensor.

7. The method of claim 1, wherein the plurality of entities comprise at least one of a person, a vehicle, an event, a facility, a mission, a location, or an object.

8. The method of claim 7, wherein the plurality of entities are defined based on information from at least one of an event or signal activation.

9. The method of claim 1, wherein the data collected from the one or more remote sensors comprises: location, heading, altitude, sensor depression, damage, sensor stare point, footprint field of view, or battery level.

10. The method of claim 1, further comprising:
receiving a selection of one of the plurality of entities overlaid on the displayed video, wherein the selected overlaid entity is moved within the displayed video and a location of the moved overlaid entity is updated in the database.

11. The method of claim 1, further comprising:
displaying a map;
receiving a selection to drag and drop one of the plurality of entities onto the displayed map;
determining a location of the dropped entity; and
updating the database with the location of the dropped entry.

12. The method of claim 1, further comprising:
inserting one or more annotations into the displayed video, wherein the annotations are associated with one or more entities of the plurality of entities.

13. A non-transitory computer readable medium storing computer readable program code, that when executed by a computer, cause the computer to:
receive information on a plurality of entities;
store the information on the plurality of entities in a database;
display a graphical user interface for a user to draw a polygon defining an area of interest, wherein the area of interest contains one or more of the plurality of entities;
receive the defined area of interest;
determine a field of view of one or more remote sensors based on geo-spatial information regarding the remote sensor;
store imagery and data from the one or more remote sensors;
monitor a field of view of the one or more remote sensors;
determine when the field of view and the area of interest intersect using the processor;
capture imagery of the remote sensor when there is an intersection;
store the captured imagery and the geo-spatial information at a time there is an intersection in a database;
create a relationship between the captured imagery and the one or more of the plurality of entities contained in the area of interest;
store the relationship in the database;
calculate an association matrix between the plurality of entities, the association matrix calculated using the information on the plurality of entities, the relationship, the imagery, and the data from the one or more remote sensors;
display a link diagram of the plurality of entities based on the association matrix between the plurality of entities; and
display video received from the one or more remote sensors with one or more of the plurality of entities overlaid on the displayed video.

14. The non-transitory computer readable medium of claim 13, wherein the computer readable program code further causes the computer to:
calculate the field of view of the one or more remote sensors based on geo-spatial information from the one or more remote sensors.

15. The non-transitory computer readable medium of claim 13, wherein the computer readable program code further causes the computer to:
determine geo-spatial information of an entity of the plurality of entities indicating the entity is within the field of view of the one or more remote sensors.

16. The non-transitory computer readable medium of claim 15, wherein the computer readable program code further causes the computer to:
search a database of entities to determine the geo-spatial information of at least one entity of the plurality of entities that intersects with the field of view of the sensor.

17. The non-transitory computer readable medium of claim 15, wherein the plurality of entities comprise at least one of a person, a vehicle, an event, a facility, a mission, a location, or an object.

18. The non-transitory computer readable medium of claim 13, wherein the data stored from the one or more remote sensors comprises: location, heading, altitude, sensor depression, damage, sensor stare point, footprint field of view, or battery level.

19. The non-transitory computer readable medium of claim 13, wherein the computer readable program code further causes the computer to:
receive a selection of one of the plurality of entities overlaid on the displayed video, wherein the selected overlaid entity is moved within the displayed video and a location of the moved overlaid entity is updated in the database.

20. The non-transitory computer readable medium of claim 13, wherein the computer readable program code further causes the computer to:
display a map;
receive a selection to drag and drop one of the plurality of entities onto the displayed map;
determine a location of the dropped entity; and
update the database with the location of the dropped entry.

21. The non-transitory computer readable medium of claim 13, wherein the computer readable program code further causes the computer to:
Insert one or more annotations into the displayed video, wherein the annotations are associated with one or more entities of the plurality of entities.

* * * * *